United States Patent [19]
Cummings

[11] Patent Number: 5,495,868
[45] Date of Patent: Mar. 5, 1996

[54] ROTARY VACUUM-ELECTRIC SWITCH

[75] Inventor: John G. Cummings, Cary, Ill.

[73] Assignee: Indak Manufacturing Corp., Northbrook, Ill.

[21] Appl. No.: 367,806

[22] Filed: Dec. 30, 1994

Related U.S. Application Data

[62] Division of Ser. No. 107,890, Aug. 16, 1993, Pat. No. 5,396,928, which is a division of Ser. No. 697,592, May 8, 1991, Pat. No. 5,250,770.

[51] Int. Cl.⁶ .................. F16K 11/065; F16K 31/54; F16K 51/00
[52] U.S. Cl. .................. 137/315; 74/30; 137/353; 137/560; 137/625.48; 200/61.86; 251/250
[58] Field of Search .................. 74/29, 30, 31; 137/353, 625.2, 625.25, 625.48, 637, 637.1, 315, 560; 200/61.86, 16 C, 295; 251/129.01, 129.04, 250, 297

[56] References Cited

U.S. PATENT DOCUMENTS

| | | | |
|---|---|---|---|
| 3,556,151 | 1/1971 | Masuda | 137/625.25 |
| 3,637,962 | 1/1972 | Fiddler et al. | 137/625.48 |
| 4,126,153 | 11/1978 | Raab | 137/353 |
| 4,305,569 | 12/1981 | Raab et al. | 137/353 |
| 4,448,390 | 5/1984 | Halstead et al. | 137/625.48 |
| 4,679,588 | 7/1987 | Raab et al. | 251/250 |
| 4,727,905 | 3/1988 | Kitamura | 137/625.48 |

*Primary Examiner*—George L. Walton
*Attorney, Agent, or Firm*—Palmatier & Zummer

[57] ABSTRACT

A shaft is rotatable in a housing to several detented positions, established by a detent wheel and spring pressed detent balls, and is provided with a pinion gear which drives a gear rack on a valve carriage guided for linear movement along a spacer. A rubber valve on the carriage is movable across vacuum valve ports to perform vacuum switching functions. A bearing on the carriage moves along a slot in the spacer and carries an idler gear which rolls along a gear rack on the housing and drives a gear rack on an electrical carriage, slidable along the spacer. Fan and clutch contactors are movable with the electrical carriage across fixed contacts to perform electrical switching functions. The detent balls and springs can be inserted through access slots from outside the housing. The housing has two mounting members with latching hooks projecting forwardly for insertion into slots in a supporting panel. A boss on the housing around the shaft is insertable into an opening in the panel. The location of the boss forms a triangle with the locations of the hooks, whereby rotation of the housing on the panel is prevented. The hooks are located and configured to afford a tight interference fit with the panel. A uniquely located keying pin mates with a keying opening in the panel. Another uniquely located keying pin on the valve carriage mates with a keying opening in the valve to preclude assembly of an incorrect valve. An assembly fixture is adapted to be used for assembling the switch and is provided with an alignment pin adapted to extend through openings in the front housing wall, the clutch contactor and the electrical carriage as well as into a blind opening in the bearing, to insure correct assembly. A uniquely located keying tab on the valve carriage is movable through a keying slot in a flange on the housing, during the assembly, to preclude the assembly of an incorrect carriage.

2 Claims, 23 Drawing Sheets

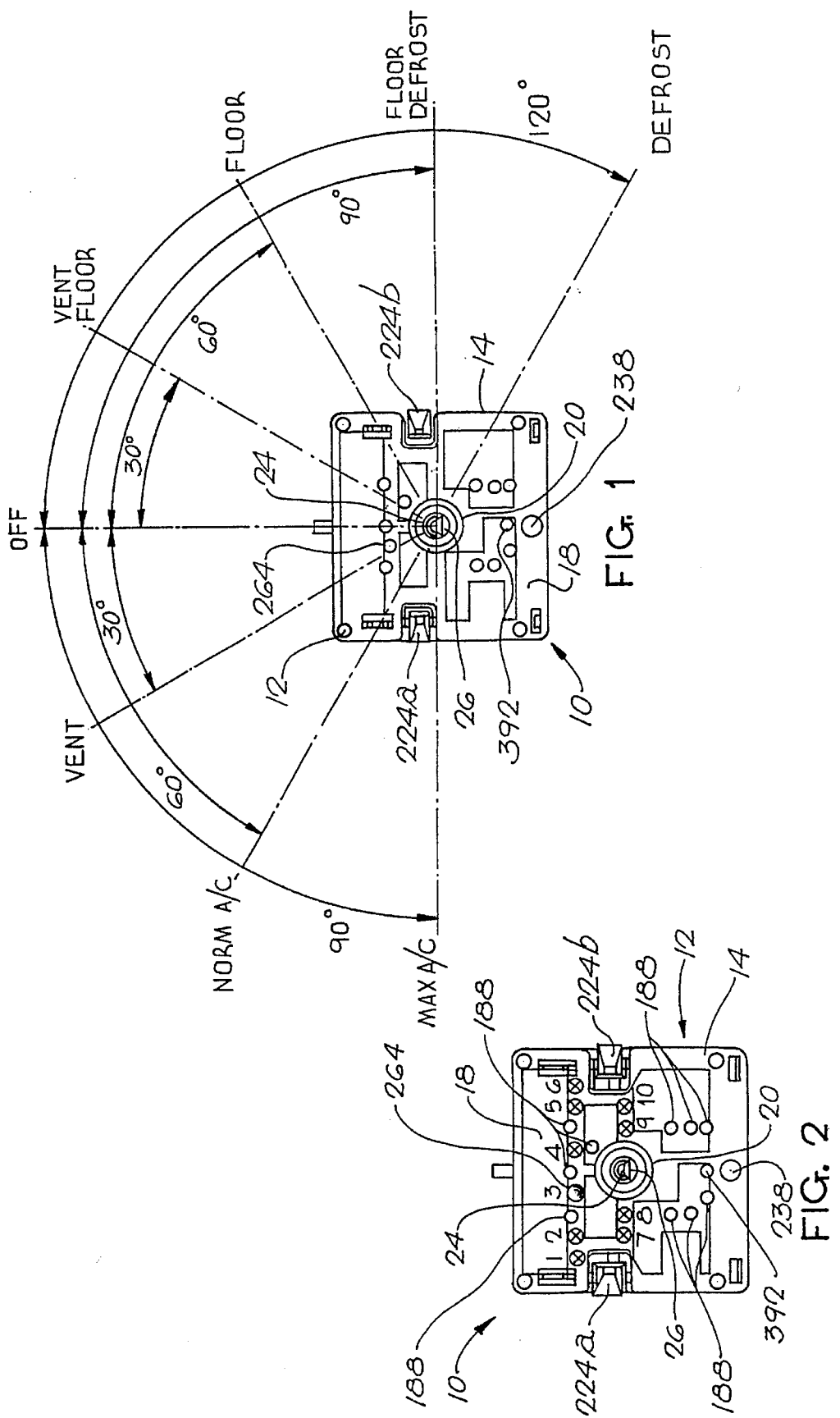

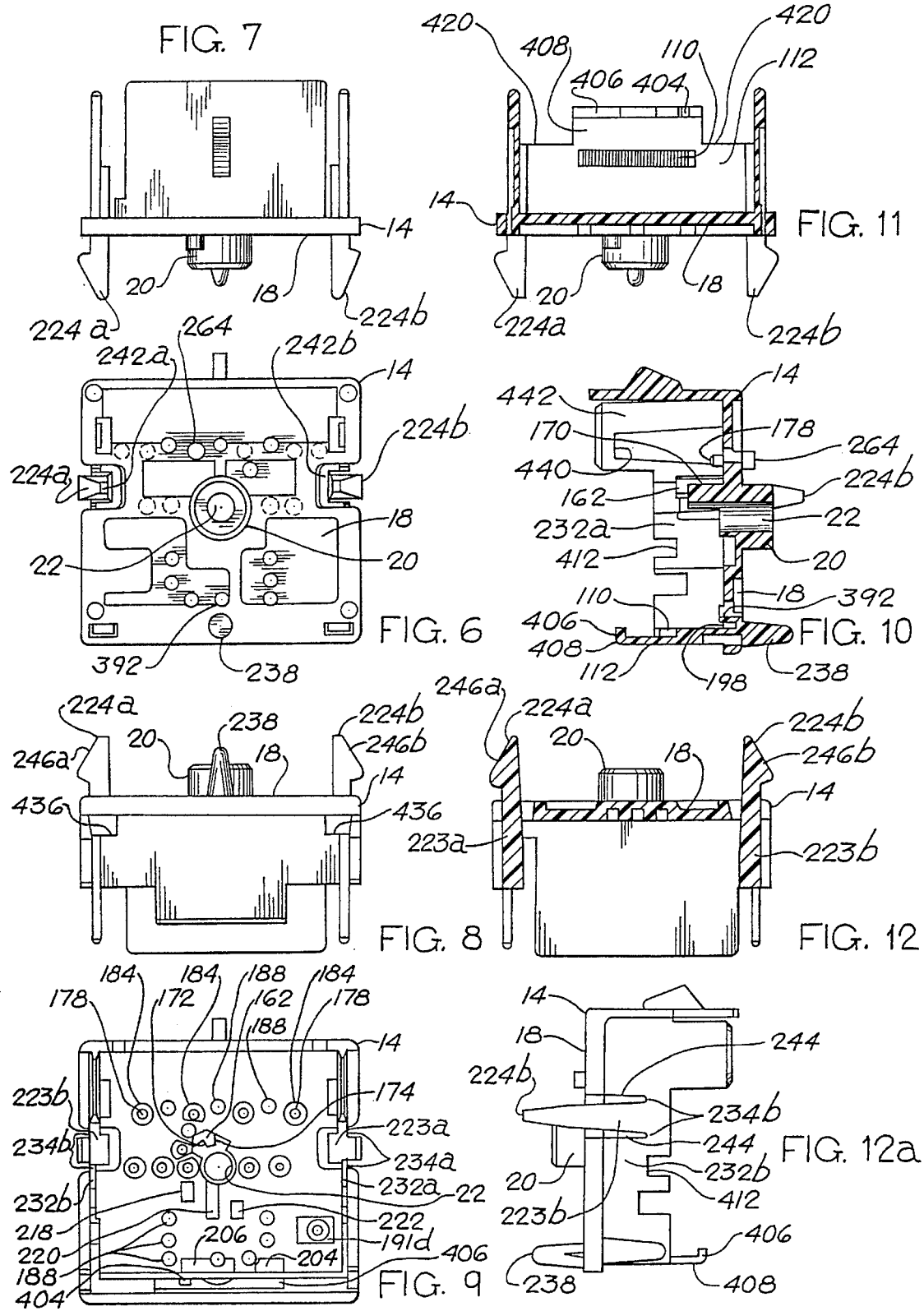

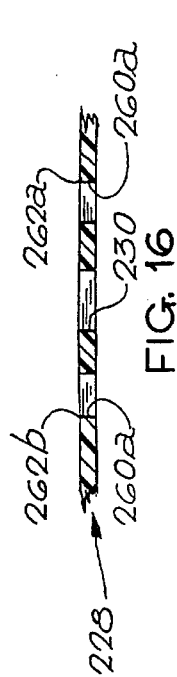
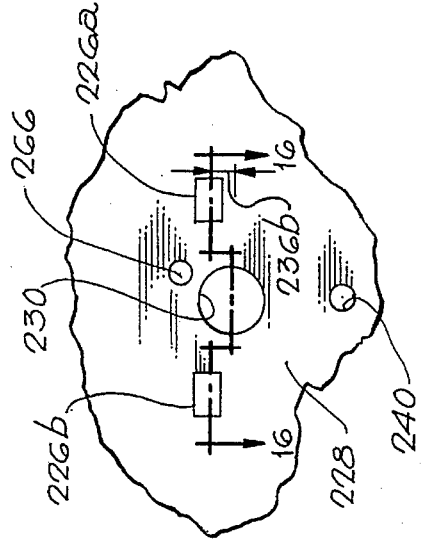
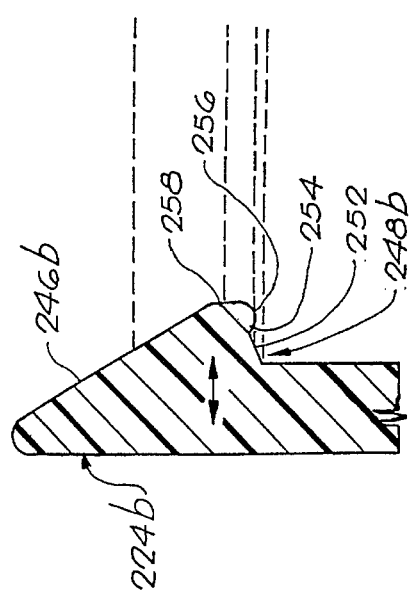
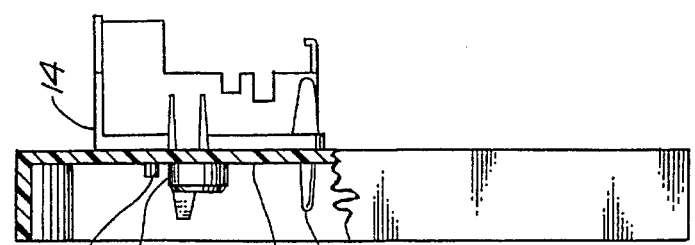
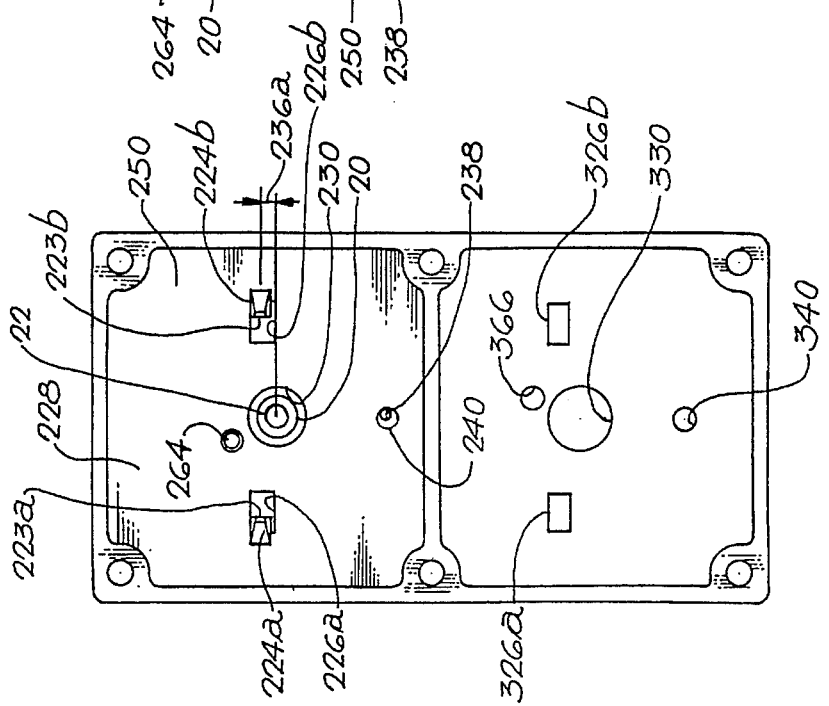

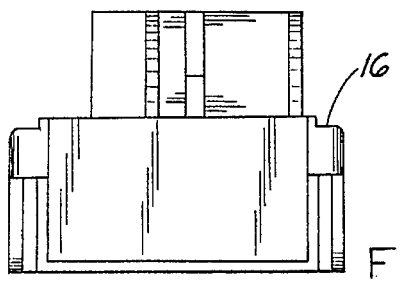
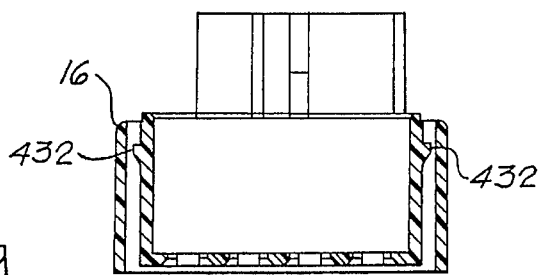
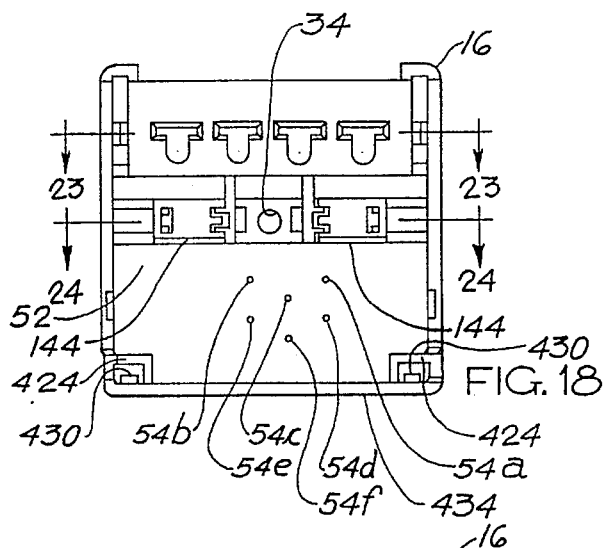
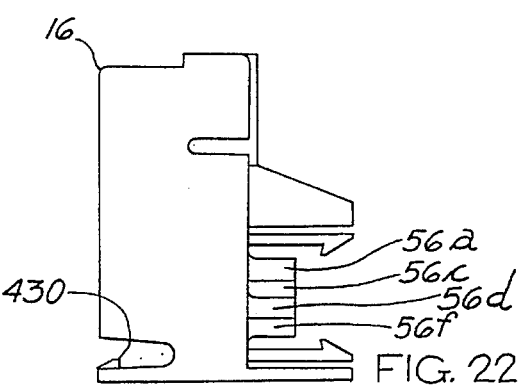
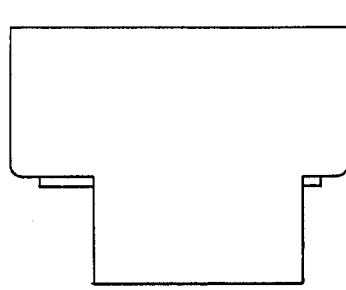
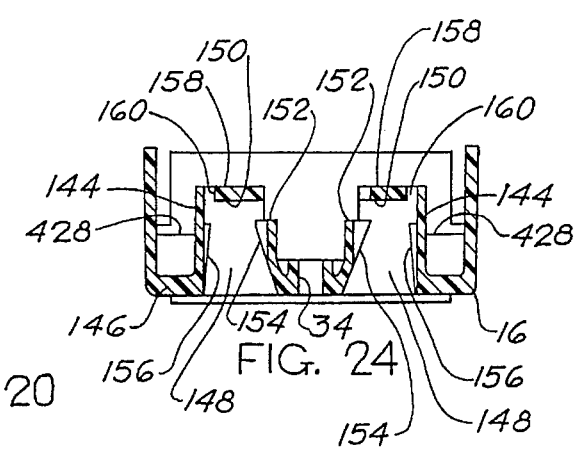
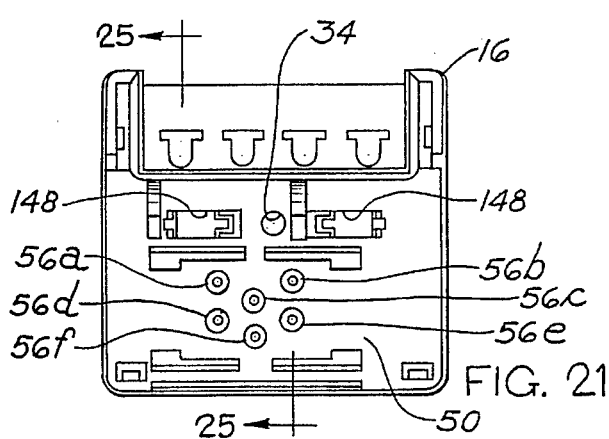
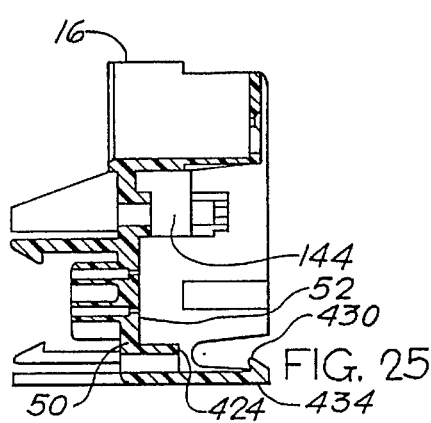

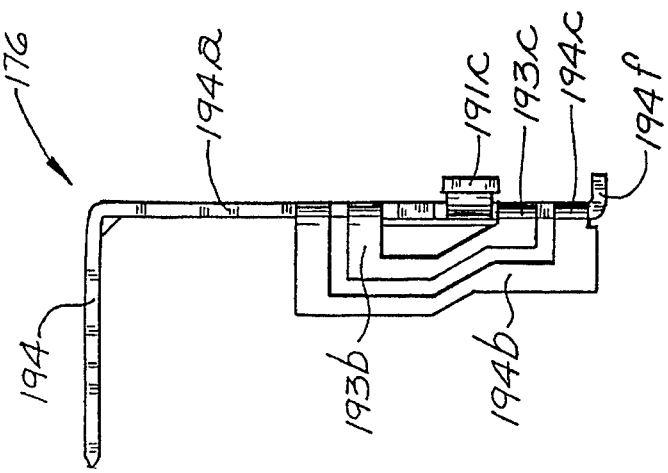
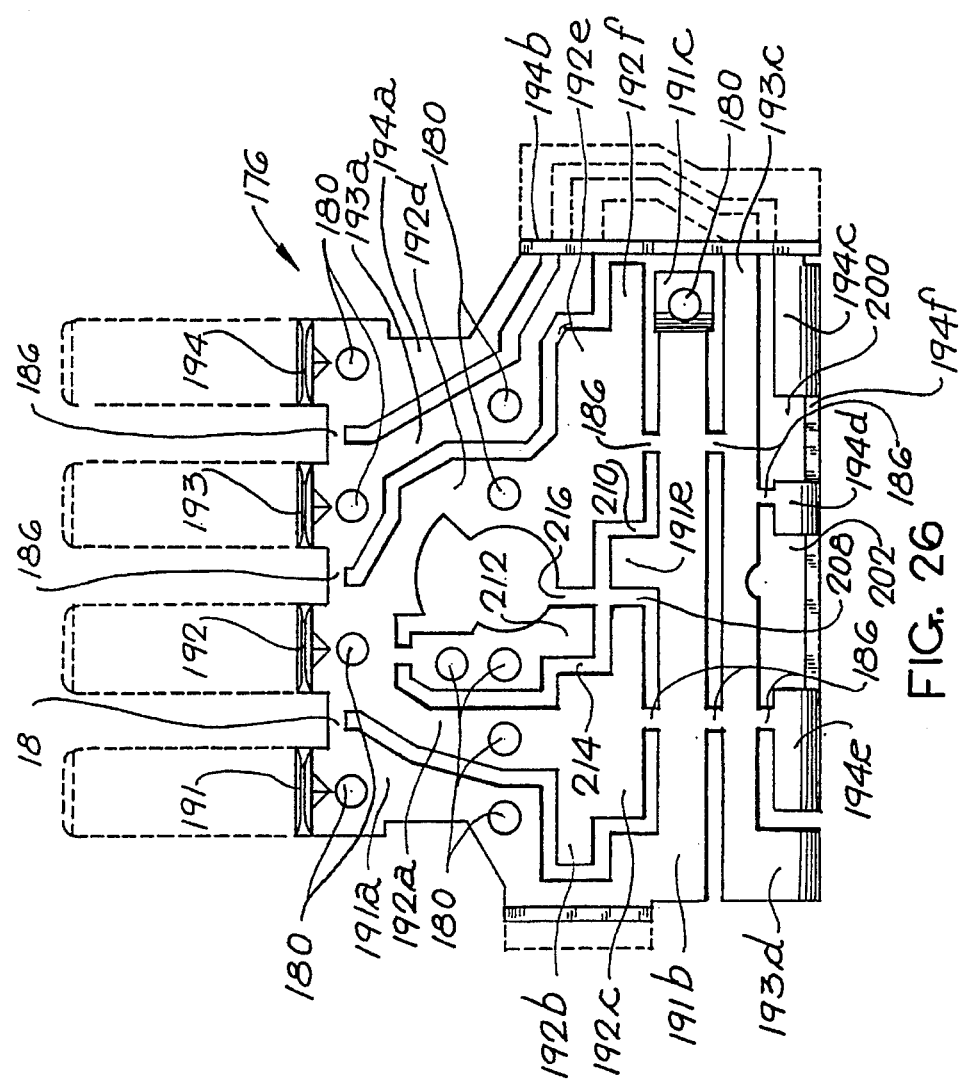
FIG. 27
FIG. 26

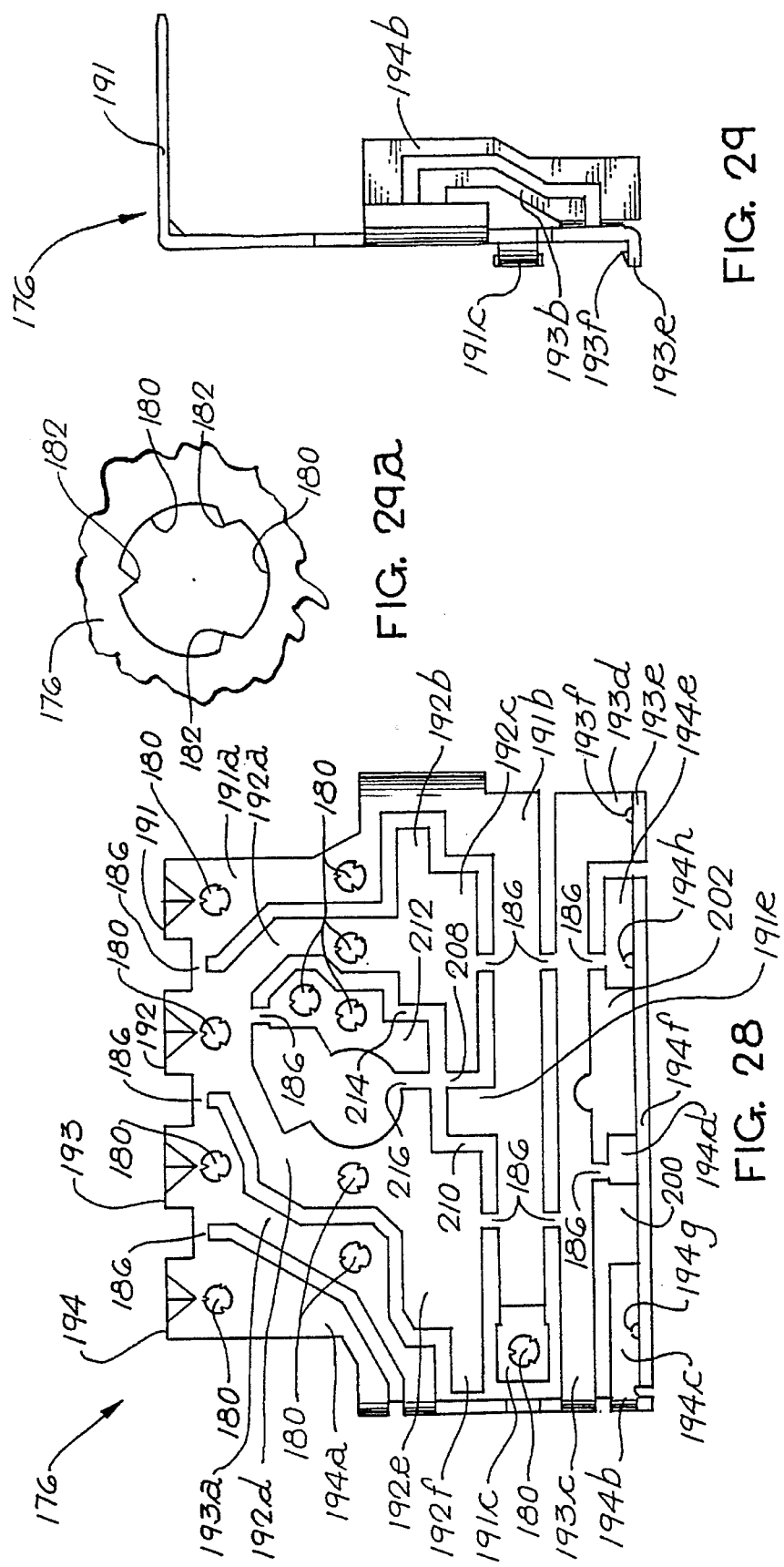

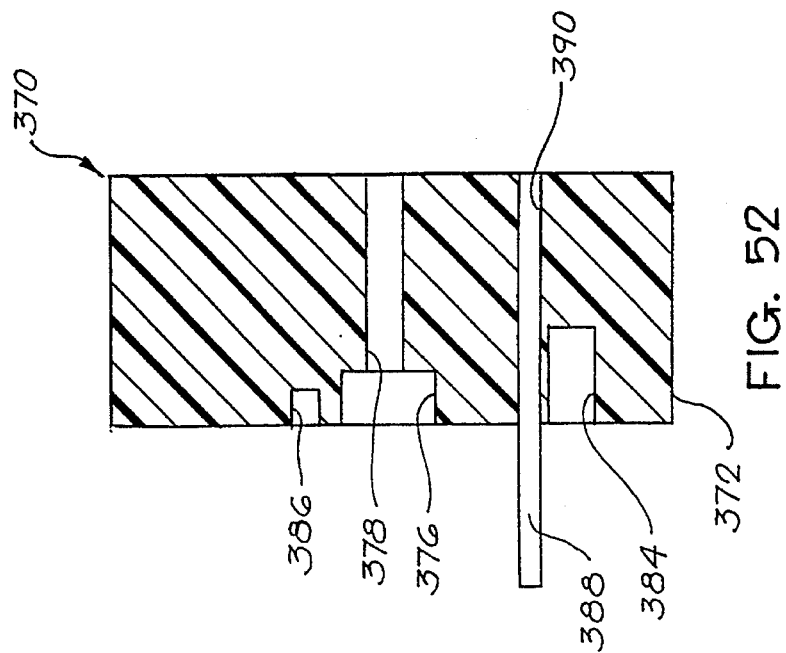
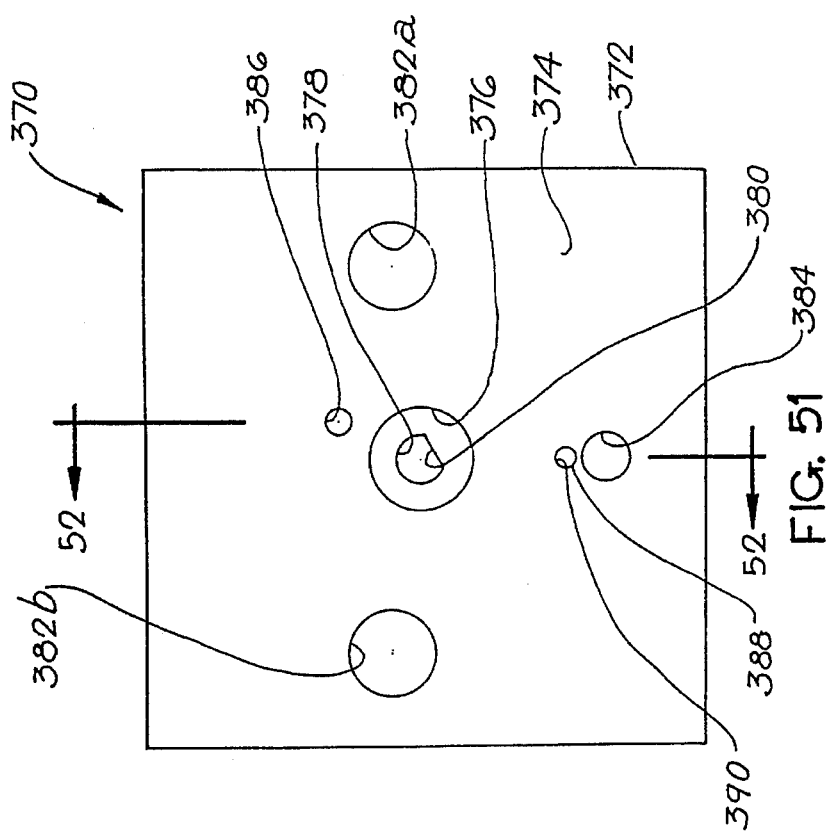

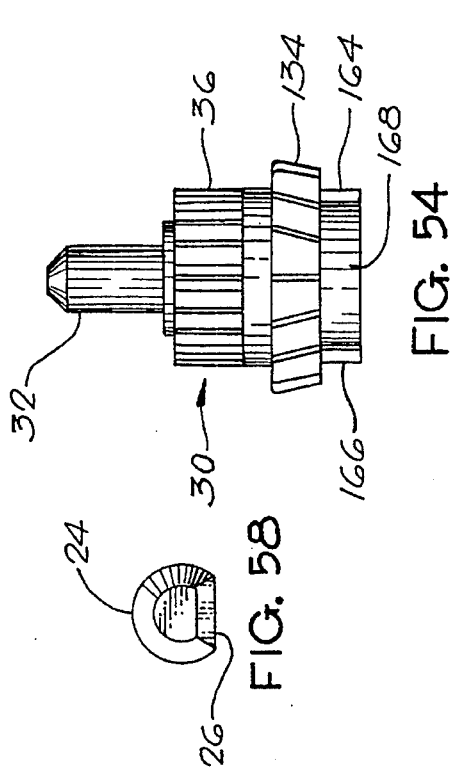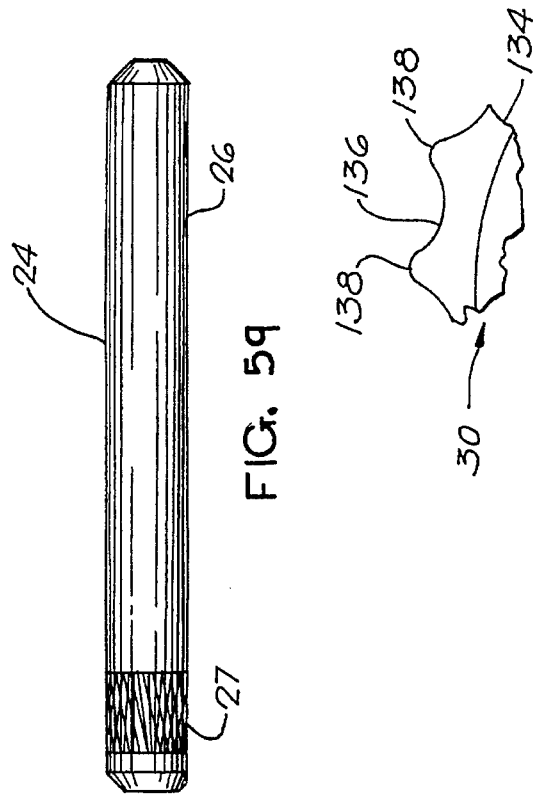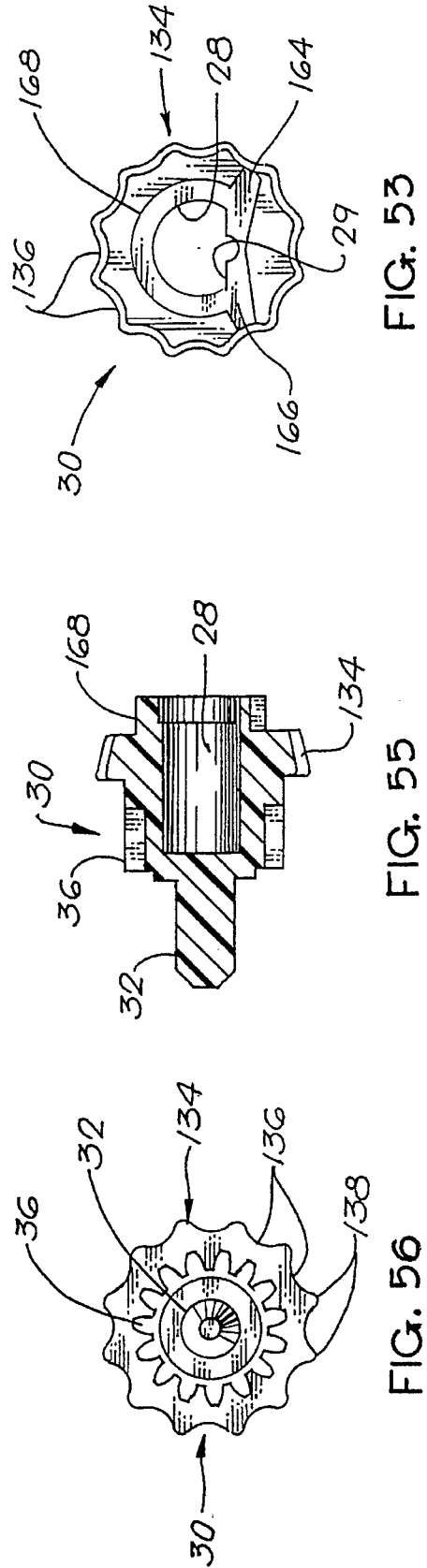

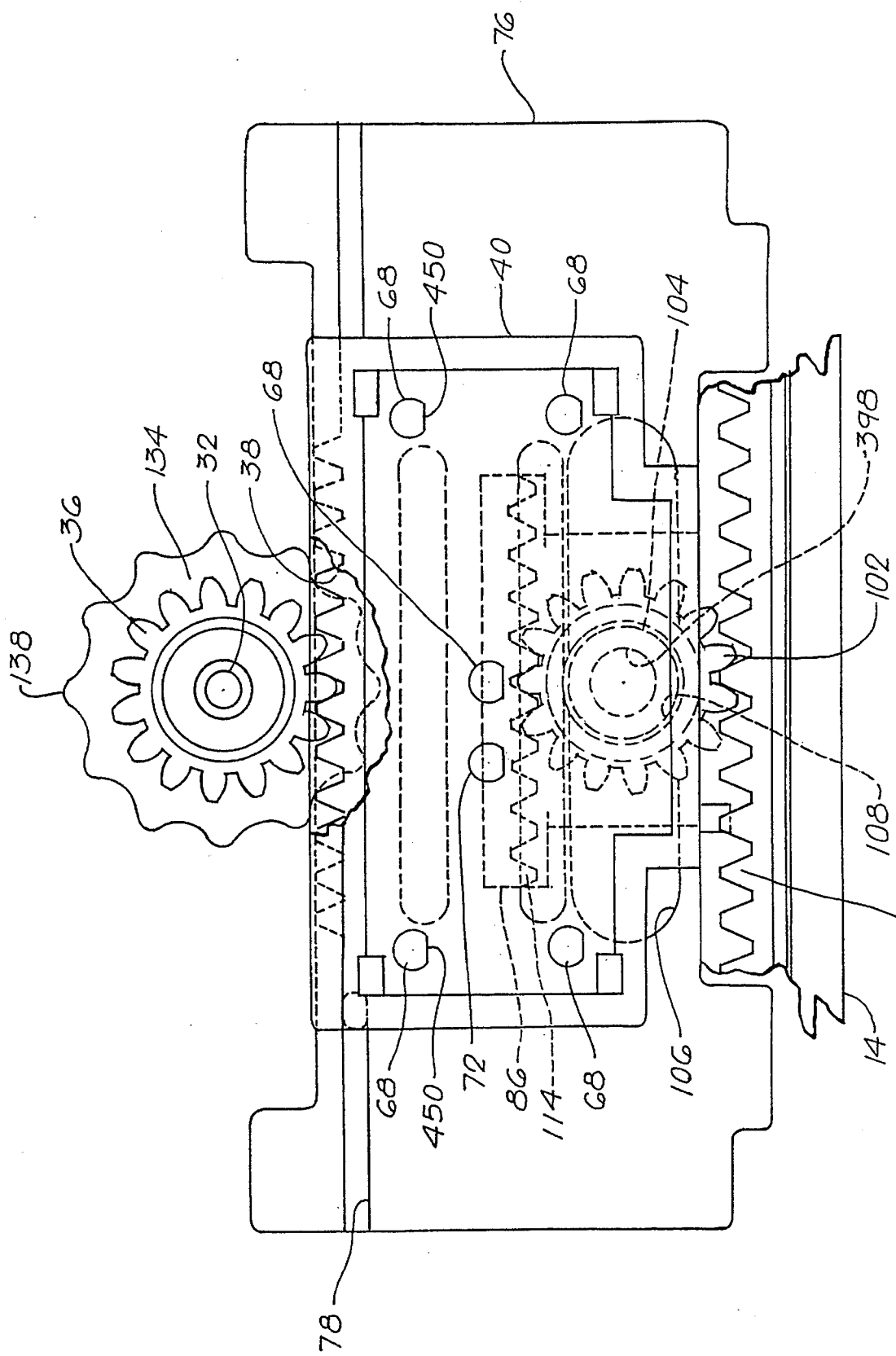

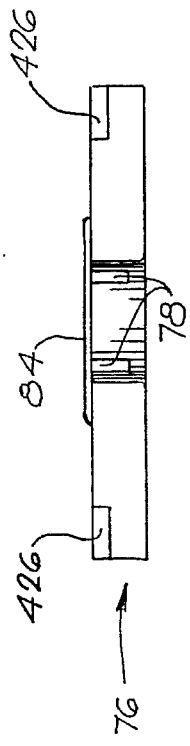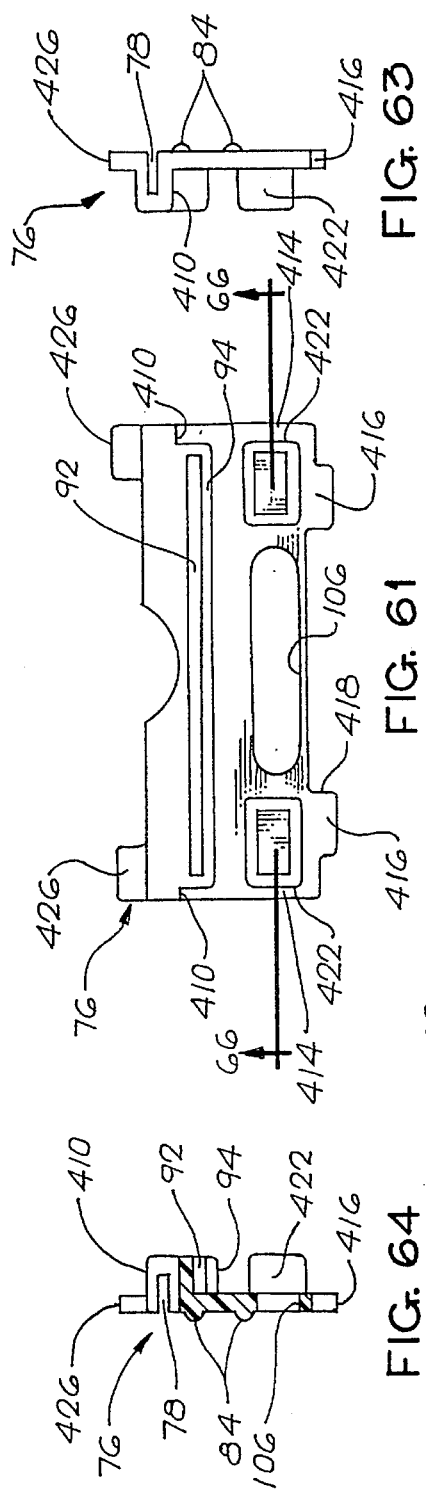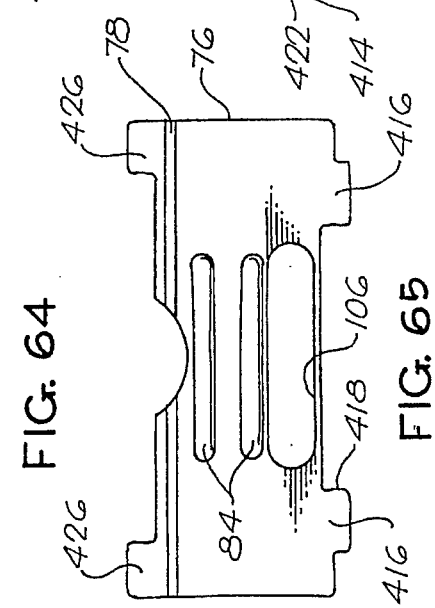

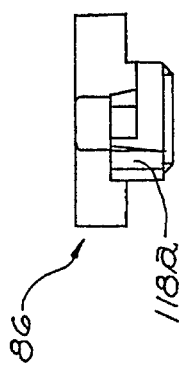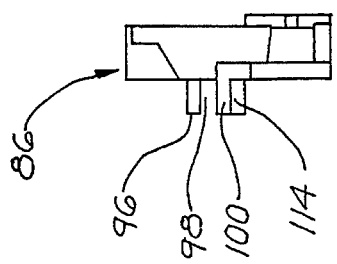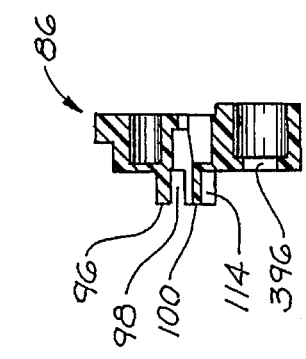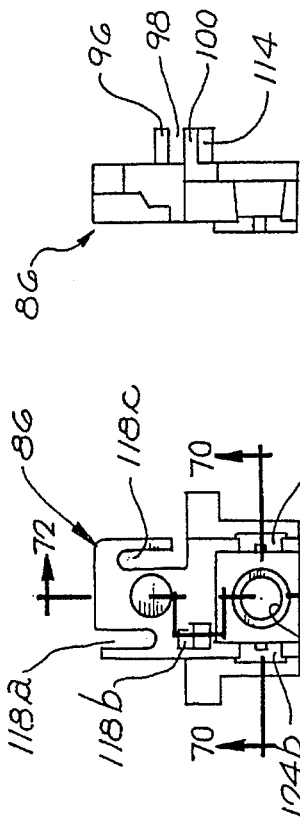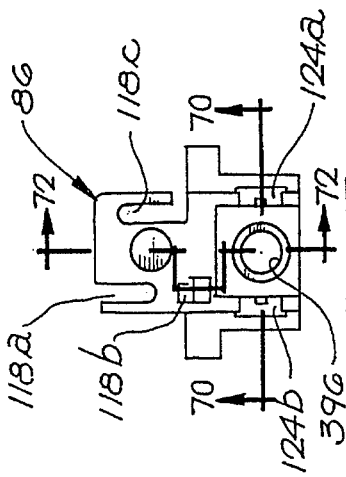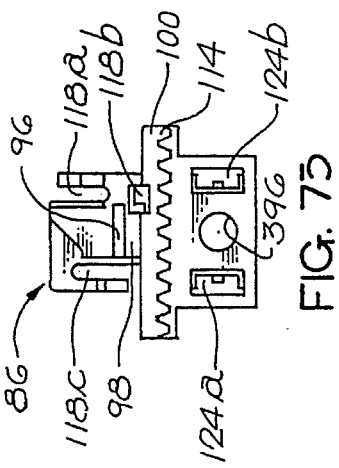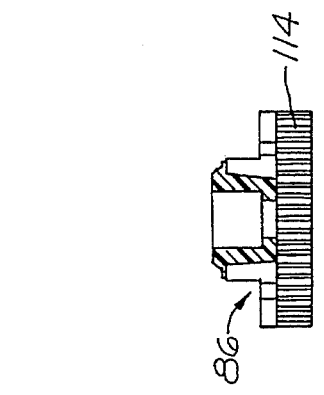

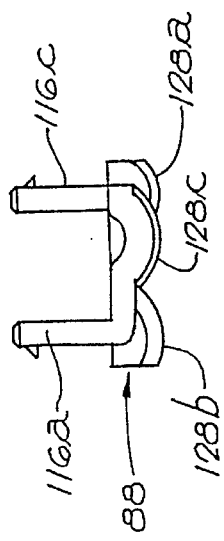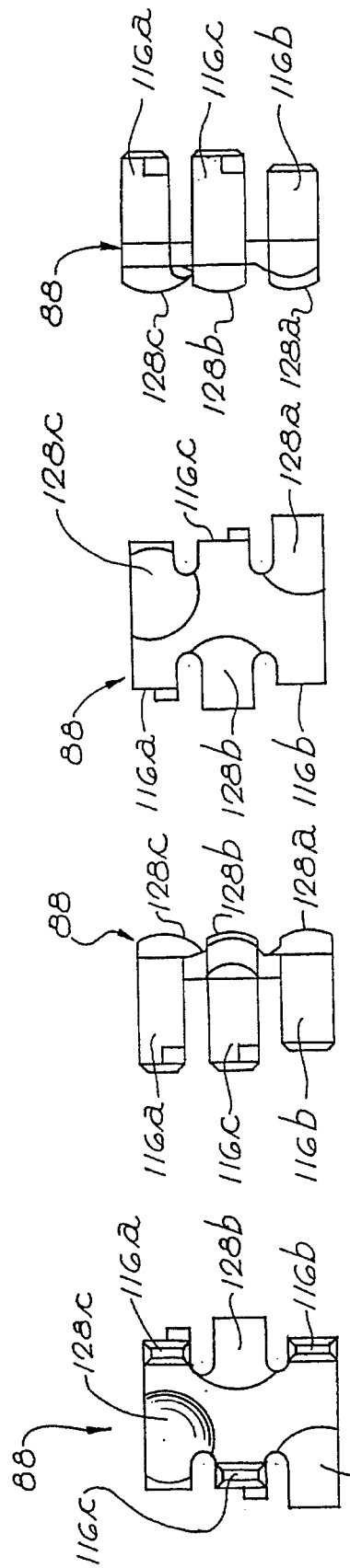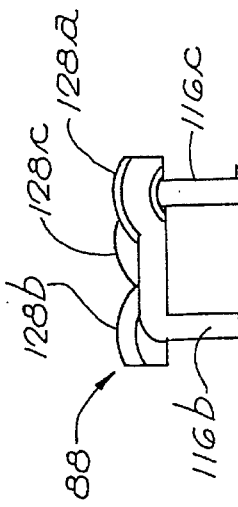

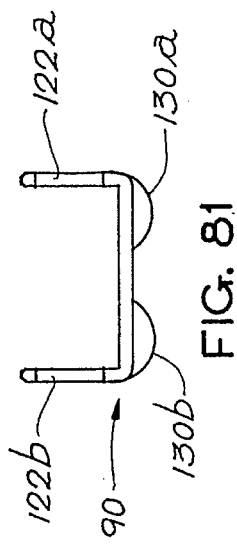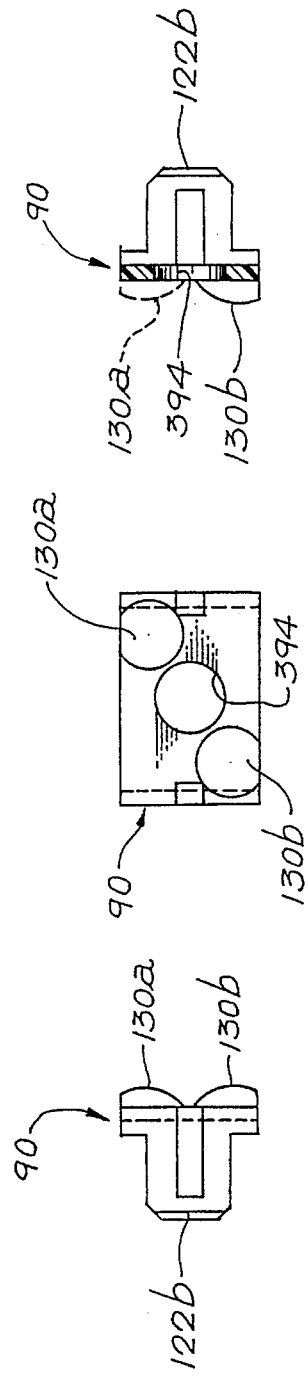

FIG. 86

| PORT | FUNCTION | MODE SELECTOR VACUUM SWITCH | | | | | | | |
|---|---|---|---|---|---|---|---|---|---|
| | | DETENT POSITION | | | | | | | |
| | | MAX A/C | NORM A/C | VENT | OFF | VENT FLOOR | FLOOR | FLOOR DEFROST | DEFROST |
| 54a | RECIRC-F/A | V | A | A | V | A | A | A | A |
| 54b | FULL FLOOR | V | V | V | V | V | V | A | A |
| 54c | DEF/FLOOR | V | V | V | V | V | V | V | A |
| 54d | FULL VENT | V | V | V | A | A | A | A | A |
| 54e | SOURCE | V | V | V | V | V | V | V | V |
| 54f | VENT/FLOOR | V | V | V | A | V | A | A | A |

V=VACUUM, A=ATMOSPHERE

| TERM | FUNCTION | AMPS | MODE SELECTOR ELECTRIC SWITCH | | | | | | | |
|---|---|---|---|---|---|---|---|---|---|---|
| | | | DETENT POSITION | | | | | | | |
| | | | MAX A/C | NORM A/C | VENT | OFF | VENT FLOOR | FLOOR | FLOOR DEFROST | DEFROST |
| 191 | BLOWER | 30 | 191+ 192 | 191+ 192 | 191+ 192 | NONE | 191+ 192 | 191+ 192 | 191+ 192 | 191+ 192 |
| 192 | BATTERY | | | | | | | | | |
| 193 | A/C CLUTCH | 4 | 193+ 194 | 193+ 194 | NONE | NONE | 193+ 194 | NONE | 193+ 194 | 193+ 194 |
| 194 | BATTERY | | | | | | | | | |

FIG. 87

ROTARY VACUUM-ELECTRIC SWITCH

This application is a division, of application Ser. No. 08/107,890, filed Aug. 16, 1993, now U.S. Pat. No. 5,396,928 which is a division of application Ser. No. 07/697,592, filed May 8, 1991, now U.S. Pat. No. 5,250,770.

FIELD OF THE INVENTION

This invention relates to a rotary vacuum-electric switch for use on automotive vehicles. Certain aspects of the invention relate broadly to rotary control devices for automotive vehicles.

BACKGROUND OF THE INVENTION

Vacuum-electric switches have been widely used for controlling the various functions of automotive heating, air conditioning and ventilating systems. Virtually all such systems include a fan or blower for circulating air into the cab of a vehicle. The fan is driven by an electrical motor which is energized and de-energized by the electrical switching components of the vacuum-electric switch. If the vehicle is equipped with air conditioning, the vehicle is provided with an air conditioning compressor which is typically driven by an electrically operable clutch connected between a drive pulley and the air conditioning compressor. A belt extends between the drive pulley and another pulley which is rotated by the engine of the vehicle. The energization of the air conditioning clutch is controlled by additional electrical switching components of the vacuum-electric switch.

The system is typically provided with a variety of dampers or doors whereby the intake and outflow of air to and from the blower may be controlled. Typically, the dampers or doors are adapted to be moved by vacuum operable motors or devices. The supply of vacuum to the vacuum motors is controlled by the vacuum switching components of the vacuum-electric switch.

The general concept of a rotary vacuum-electric switch is disclosed by the Raab and Cobb U.S. Pat. No. 4,679,588, issued Jul. 14, 1987 and assigned to the assignee of the present application. The switch of such patent comprises a rotatable operating shaft connected to a pinion gear which meshes with a linear gear rack on a translatable valve carriage. A silicone rubber valve is movable with the carriage and is adapted to control the supply of vacuum to a variety of ports, adapted to be connected to the various vacuum motors. An electrically insulating switch carriage is rotatable with the shaft and is provided with two electrically conductive contactors which are movable with the electrical carriage along arcuate paths. The contactors are adapted to engage stationary contacts for controlling the energization of the fan motor and the air conditioning clutch. The electrically insulating carriage has an arcuate detent portion formed with a series of detent notches adapted to be engaged by a spring-pressed detent ball.

While the rotary vacuum-electric switch of the above-mentioned patent is functional and operative, it leaves a great deal of room for improvement, particularly as to adaptability to a wide range of applications, compactness and ease of assembly and mounting in a vehicle.

OBJECTS OF THE INVENTION

One object of the present invention is to provide a new and improved rotary vacuum-electric switch which is readily adaptable to a wide variety of applications including systems having only heating and ventilating components, and other systems having heating, air conditioning and ventilating components, for example.

A further object is to provide such a new and improved rotary vacuum-electric switch in which only a minimum number of components need to be changed in order to adapt the switch for a wide variety of applications.

Another object is to provide such a new and improved rotary vacuum-electric switch which is constructed and arranged so as to insure that the changed components for a particular application are correctly mated, whereby assembly of the wrong components is avoided.

A further object is to provide such a new and improved vacuum-electric switch in which the organization of the vacuum switching components and the electrical switching components is improved.

Another object is to provide such a new and improved vacuum-electric switch which is adapted to be correctly assembled in a foolproof manner, preferably with the aid of a new and improved assembly fixture.

Another object is to provide a new and improved rotary vacuum-electric switch having an improved mounting system for mounting the switch on a control panel or the like.

A further object is to provide a new and improved mounting system which is applicable not only to rotary vacuum-electric switches, but also to other rotary control devices.

Another object is to provide a new and improved mounting system of the foregoing character in which the housing of the rotary switch or other control device is provided with latching hooks adapted to be inserted into slots in a control panel by pushing the housing forwardly along a linear path, whereby the assembly may readily be carried out by a robotic assembly machine.

Another object is to provide such a new and improved mounting system which is constructed and arranged so as to stabilize the housing of the rotary switch or other control device against any rotary displacement, looseness or play.

A further object is to provide such a new and improved mounting system in which the latching hooks are constructed and arranged so that the housing will remain securely mounted on the control panel despite the application of a large rearward force to the housing.

Another object is to provide a new and improved mounting system which incorporates a keying system whereby only the correct switch or other control device can be mounted on the control panel at any particular location.

A further object is to provide a new and improved rotary vacuum-electric switch or other rotary control device having a new and improved detent system whereby the detent balls and springs can be assembled with the other components of the switch, either before or after the assembly of the other components has been completed.

Another object is to provide such a new and improved rotary vacuum-electric switch or other control device which is constructed and arranged so that the detent balls and springs can be assembled from the outside of the housing for the switch or other device, after it has been otherwise fully assembled.

SUMMARY OF THE INVENTION

To achieve these and other objects, the present invention provides a rotary vacuum-electric switch, comprising a housing, an operating shaft rotatable in the housing to a plurality of angularly spaced positions, a pinion gear rotatable with the shaft in the housing, a valve carriage movable in the housing and having a first gear rack meshing with the pinion gear, first guide means in the housing for guiding the valve carriage for translatory movement along a predetermined path, vacuum valve means on the valve carriage and the housing for performing vacuum valving functions when the valve carriage is translated in the housing, bearing means on the carriage, an idler gear rotatably mounted on the bearing means and translatable with the valve carriage, a second gear rack which is stationary in the housing and which meshes with the idler gear for causing rotation thereof when the valve carriage is translated, an electrical carriage translatable in the housing, second guide means in the housing for supporting the electrical carriage for translatory movement in the housing along a predetermined path which is generally parallel with the path of the valve carriage, electrical switching means on the electrical carriage and the housing for performing electrical switching functions when the electrical carriage is translated, and a third gear rack on the electrical carriage and meshing with the idler gear for causing translatory movement of the electrical carriage in response to the rotation and translatory movement of the idler gear.

The rotary vacuum-electric switch also preferably comprises detent means on the shaft and the housing for detaining the shaft in each of the angularly spaced positions. The detent means may comprise a detent wheel mounted on the shaft in the housing and having a plurality of angularly spaced recesses therein, at least one complementary detent element movably mounted in the housing and engageable with the recesses for producing a detent action therewith, and resilient means for biasing the detent element toward the detent wheel. The first and second guide means for the valve carriage and the electrical carriage preferably comprise a spacer disposed between the valve carriage and the electrical carriage and having first and second guide elements for guiding the valve carriage and the electrical carriage for translatory movement in the housing. The spacer is preferably disposed between the valve carriage and the idler gear, the spacer having an opening therein for receiving the bearing. The opening preferably has a configuration to provide for the translatory movement of the bearing with the valve carriage. The opening preferably takes the form of an elongated slot in the spacer for receiving the bearing throughout its range of translatory movement with the valve carriage.

The vacuum valve means may comprise a wall on the housing and having a substantially flat valve surface with a plurality of valve ports extending through the wall and communicating with the interior of the housing along the valve surface. The vacuum valve means may comprise a soft resilient plate-like valve mounted on the valve carriage and slidable along the valve surface, the valve having passage-forming means for selectively establishing communication between the valve ports. Valve spring means may be mounted on the valve carriage and may slidably engage the spacer for biasing the valve into slidable sealing engagement with the valve surface. The valve spring means may comprise a leaf spring mounted on the valve carriage and slidably engaging the spacer throughout the range of translatory movement of the valve carriage.

The spacer preferably comprises rib means projecting therefrom and slidably engaging the leaf spring throughout the range of sliding movement of the valve carriage, the rib means extending substantially in the direction of translatory movement of the valve carriage.

The housing of the switch preferably comprises an electrical contact supporting wall having a first alignment opening therein. The electrical switching means may comprise fixed contact means mounted on the electrical contact supporting wall within the housing. Moreover, the electrical switching means may comprise electrical contactor means mounted on the electrical carriage for slidably engaging the fixed contact means. Preferably, a second alignment opening is formed in the electrical contactor means and is adapted to be aligned initially with the first alignment opening. The bearing means may have a third alignment opening therein adapted to be aligned initially with the first and second alignment openings, whereby the correct initial assembly of the electrical contactor means, the electrical carriage, the bearing means, the vacuum valve and the idler gear can readily be assured by initially aligning the first, second and third alignment openings.

For use in assembling the switch, the invention may provide an assembly fixture having an alignment pin initially receivable in the first, second and third alignment openings for achieving alignment thereof. The fixture preferably comprises a shaft opening therein for receiving the operating shaft, the shaft being generally cylindrical with a flat alignment surface thereon. The fixture preferably has a complementary flat alignment surface extending along the shaft opening for initially establishing the correct angular position of the operating shaft to assure correct assembly of the pinion gear with the first gear rack on the valve carriage.

More broadly speaking, the shaft may be generally cylindrical but with a non-cylindrical alignment portion thereon. The fixture may have a complementary non-cylindrical alignment portion extending along the shaft opening for initially establishing the correct angular position of the operating shaft to assure correct assembly of the pinion gear with the first gear rack on the valve carriage.

Mating key and keyway elements are preferably located on the housing and the valve carriage in a selected one of a plurality of keying positions for assuring correct mating of the valve carriage and the housing during the assembly of the valve carriage and the housing.

The key and keyway elements preferably comprise a projecting tab on the valve carriage and a portion on the housing having a slot for receiving the tab, the portion being located on the housing to obstruct the assembly of the valve carriage into the housing if the tab is not properly mated with the slot.

In another aspect, the invention provides a rotary vacuum valve, comprising a housing, an operating shaft rotatable in the housing to a plurality of angularly spaced positions, a pinion gear rotatable with the shaft in the housing, a valve carriage movable in the housing and having a gear rack meshing with the pinion gear, guide means in the housing for guiding the valve carriage for translatory movement along a predetermined path, vacuum valve means on the valve carriage and the housing for performing vacuum valving functions when the valve carriage is translated in the housing, and mating key and keyway elements located on the housing and the Valve carriage in a selected one of a plurality of predetermined keying positions to assure correct mating of the valve carriage and the housing during the initial assembly of the valve carriage with the housing, one of the elements being disposed on the valve carriage while the other of the elements is disposed on the housing, the element disposed on the housing being positioned on the housing to obstruct the assembly of the valve carriage with the housing if the elements are not properly mated.

The key and keyway elements preferably comprise a tab projecting from the valve carriage and a mating slot in a portion of the housing for receiving the tab. The portion on the housing is preferably in the form of a ledge on the housing spaced away from the predetermined path of the valve carriage and out of engagement with the valve carriage when the valve carriage is fully assembled with the housing and is movable along its predetermined path.

The invention also provides a rotary control device for an automotive vehicle, comprising a housing having a front wall made of a resinous plastic material, the housing having a generally cylindrical boss projecting forwardly from the front wall of the housing, a substantially cylindrical opening extending axially in the boss and through the front wall, a rotary control shaft rotatably mounted in the opening, and first and second flexible resilient mounting members formed in one piece with the housing and projecting forwardly beyond the front wall, the mounting members having front portions in the form of respective latching hooks, the mounting members being centered in a predetermined plane substantially parallel with but offset laterally from the axis of the boss whereby the boss and the mounting members define a triangular configuration for stabilizing the control device against rotary displacement of the housing.

The invention also preferably provides a supporting panel having a generally cylindrical opening for receiving the boss, the panel having first and second generally rectangular slots for receiving the mounting members, the slots being offset laterally from the opening to form a triangular configuration therewith.

The slots may be centered in a second plane substantially parallel with but offset from the axis of the opening by an amount greater than the offsetting of the predetermined plane of the mounting members from the axis of the boss, whereby an interference fit is produced between the triangular combination comprising the boss and the mounting members and the triangular combination comprising the opening and the slots, the mounting members being tapered to facilitate the insertion of the mounting members and the boss into the slots and the opening despite the interference fit.

More broadly speaking, the slots are centered in a second plane substantially parallel with but offset from the axis of the opening by an amount different from the offsetting of the predetermined plane of the mounting members from the axis of the boss, whereby an interference fit is produced between the triangular combination comprising the boss and the mounting members and the triangular combination comprising the opening and the slots.

The mounting members are preferably flexible in two rectangularly related directions to facilitate insertion of the mounting members and the boss into the slots and the opening despite the interference fit. One of the directions extends along the predetermined plane while the other direction is substantially perpendicular to such plane.

The front wall of the housing may also be formed with an anti-rotation pin substantially parallel with the shaft and projecting forwardly from the front wall, the pin also being spaced radially from the boss. Preferably, the anti-rotation pin is tapered forwardly.

The mounting panel preferably has an additional opening for receiving the anti-rotation pin. The forward tapering of the pin facilitates the insertion of the pin into the additional opening in the panel.

The front wall of the housing is preferably formed with a key pin projecting forwardly from the front wall and spaced radially from the boss, the key pin being located in one of a plurality of predetermined key locations on the front wall. The mounting panel has a key opening for receiving the key pin, the key opening being located in a predetermined key location corresponding with the key location of the key pin.

In another aspect, the invention provides a rotary control device for automotive vehicles, comprising a housing made of a resilient resinous plastic material and having a front wall and at least first and second substantially parallel side walls extending rearwardly from the front wall, the front wall having a generally cylindrical boss projecting forwardly therefrom, a substantially cylindrical opening extending axially in the boss and through the front wall, a rotary control shaft rotatably mounted in the opening, and first and second flexible resilient mounting members formed in one piece with the first and second side walls and projecting forwardly beyond the front wall, the housing having first and second clearance slots formed in the front wall and the first and second side walls around the first and second mounting members to provide for lateral flexing movement of the mounting members in a direction toward and away from each other, the first and second mounting members having front portions in the form of respective first and second latching hooks, each of which has a hook shoulder facing rearwardly toward the front wall and a lateral ramp tapering forwardly and laterally from the hook shoulder, each hook shoulder having a hook ramp facing toward the front wall and, sloping forwardly and laterally and terminating in a rearwardly sloping terminal portion.

The rearwardly sloping terminal portion may constitute a portion of a rounded hook extremity extending between the hook shoulder and the laterally sloping ramp.

The invention also preferably provides a supporting panel having a generally cylindrical opening therein for receiving the boss, the panel having first and second generally rectangular slots therein for receiving the first and second mounting members, each of the slots having a laterally facing wall portion for engagement by the lateral ramp of the corresponding latching hook for producing lateral flexing movement of the corresponding mounting member when the latching hooks are pushed forwardly into the slots, the panel having a front wall portion and a corner portion between the front wall portion and the laterally facing wall portion of each corresponding slot. The hook ramp of the corresponding latching hook is engageable with the corresponding corner. The rearwardly sloping terminal portion of each corresponding hook shoulder is engageable with the front wall portion of the panel for retaining the latching hooks in the slots despite the application of substantial rearward force to the housing relative to the panel.

In another aspect, the invention provides a rotary control device, comprising a housing, a rotary control shaft having an outer portion outside the housing and an inner portion within the housing, the housing having bearing means for rotatably supporting the control shaft, a detent wheel mounted on the inner portion of the shaft within the housing, the detent wheel having a plurality of angularly spaced detent recesses therein, at least one detent element movably mounted in the housing and engageable with the detent wheel for reception in the detent recesses, the housing having means forming a generally radial opening for movably receiving the detent element, and spring means in the radial opening for biasing the detent element against the detent wheel, the housing having an exterior wall opposite the radial opening, the wall having an access opening extending therein from the exterior of the housing and communicating with the radial opening for insertion of the detent element and the spring means into the radial opening from outside the housing.

Preferably, the detent element takes the form of a detent ball, while the spring means may take the form of a compression coil spring.

The radial opening preferably has an end portion adjacent the detent wheel and of a size smaller than the ball so that only a portion of the ball projects through the end portion for engagement with the detent wheel whereby the detent ball is retained in the radial opening in the absence of the detent wheel.

Preferably, the housing has front and rear walls, the bearing means being supported by the front wall, the rear wall constituting the above mentioned exterior wall, the access opening being formed in the rear wall.

The detent wheel is preferably located in the housing adjacent the front wall, the rear wall having a tunnel structure thereon extending into the housing and having a tunnel opening therein which constitutes the access opening.

Preferably, the tunnel structure includes radially inner and outer walls of the tunnel opening, the radially inner wall having first ramp means thereon for guiding the detent element through the tunnel opening and into the radial opening, the first ramp means also assisting in retaining the detent element in the radial opening.

The tunnel structure preferably includes second ramp means along the radially outer wall for guiding the spring means through the tunnel opening and into the radial opening and for assisting in retaining the spring means in the radial opening.

The housing preferably includes means forming a second radial opening diametrically opposite from the first mentioned radial opening, the device including a second detent element movably received in the second radial opening and engageable with the detent wheel in diametrical opposition to the first mentioned detent element, and second spring means received in the second radial opening for biasing the second detent element against the detent wheel, the housing having means forming a second access opening therein extending from the exterior of the housing and communicating with the second radial opening for insertion of the second detent element and the second spring means into the second radial opening from outside the housing.

In another aspect, the invention provides a vacuum valve device, comprising a housing having a wall with a substantially flat valve surface thereon inside the housing, a plate-like valve carriage having a cavity therein facing the valve surface, the wall having a plurality of vacuum distribution ports formed therein and communicating with the valve surface, a soft resilient plate-like valve member snugly received in the cavity and having vacuum distribution passage means thereon slidable along the valve surface for selectively interconnecting the ports, guiding means in the housing for guiding the valve carriage for movement of the valve carriage and the valve member along the valve surface, and control means for causing the movement of the valve carriage, the valve carriage having a plurality of tractor elements thereon projecting into the cavity, the valve member having a plurality of blind openings therein for receiving the tractor elements to transmit driving forces between the valve carriage and the valve member and to retain the valve member in the cavity.

The tractor elements preferably take the form of pins formed on the valve carriage and projecting into the cavity.

The device also preferably comprises a keying pin formed on the carriage and projecting into the cavity, the valve member having a blind keying opening for receiving the keying pin, the keying pin and the keying opening being in one unique location of a plurality of locations for precluding the assembly of an incorrect valve member with the valve carriage.

Preferably, the pins are generally cylindrical, while the openings are substantially cylindrical and are dimensioned for snugly receiving the pins. Preferably, the device comprises means forming an air escape passage between each of the pins and the corresponding opening to prevent the compression of air in the openings when the valve member is assembled with the valve carriage.

More specifically, each of the pins preferably has a flat surface thereon for providing a passage between the flat surface and the corresponding cylindrical opening so that air can escape through the passage to prevent compression of air in the openings.

BRIEF DESCRIPTION OF THE DRAWINGS

Further objects, advantages and features of the present invention will appear from the following description, taken with the accompanying drawings, in which:

FIG. 1 is a front elevational view of a rotary vacuum-electric switch to be described as an illustrative embodiment of the present invention, the view being marked to locate and identify the various detented positions of the control shaft for the switch.

FIG. 2 is a front elevational view, similar to FIG. 1, but including markings to show ten different possible locations of a key pin which is an element of a mounting system.

FIG. 6 is a front elevational view of a case constituting one component of the housing for the switch.

FIG. 7 is a top plan view of the case.

FIG. 8 is a bottom plan view of the case.

FIG. 9 is a rear elevational view of the case.

FIG. 10 is a central vertical section taken through the case of FIG. 6.

FIG. 11 is a horizontal section looking downwardly into the case.

FIG. 12 is a horizontal section looking upwardly into the case.

FIG. 12a is a right hand side view of the case.

FIG. 13 is a front elevational view of a simulated supporting panel for the rotary vacuum-electric switch, the panel being shown with the case of the switch mounted thereon.

FIG. 14 is a side elevation of the mounting panel, partly in vertical section.

FIG. 15 is a fragmentary rear elevation of the supporting panel.

FIG. 16 is a horizontal section taken through the panel, generally along the line 16—16 in FIG. 15.

FIG. 17 is a greatly enlarged fragmentary section taken horizontally through one of the latching members employed for securing the switch to a supporting panel.

FIG. 18 is a front elevational view of a cover forming the other component of the housing for the rotary vacuum-electric switch.

FIG. 19 is a top plan view of the cover of FIG. 18.

FIG. 20 is a bottom view of the cover.

FIG. 21 is a rear elevational view of the cover.

FIG. 22 is a side elevational view of the cover.

FIG. 23 is a horizontal section, taken generally along the line 23—23 in FIG. 18.

FIG. 24 is another horizontal section, taken generally along the line 24—24 in FIG. 18.

FIG. 25 is vertical section, taken generally along the broken line 25—25 in FIG. 21.

FIG. 26 is a greatly enlarged rear elevational view of a terminal cluster, prior to its installation into the rotary vacuum-electric switch.

FIG. 27 is a right side elevational view of the terminal cluster of FIG. 26.

FIG. 28 is a front elevational view of the terminal cluster.

FIG. 29 is a left side elevational view of the terminal cluster.

FIG. 29a is a greatly enlarged fragmentary elevational view, corresponding to a portion of FIG. 26, and illustrating one of the mounting holes in the terminal cluster.

FIG. 51 is a front elevational view of an assembly fixture, adapted to be employed for assembling the rotary vacuum-electric switch.

FIG. 52 is a somewhat diagrammatic vertical section, taken through the assembly fixture, generally along the broken line 52—52 in FIG. 51.

FIG. 53 is a front elevational view of the driver for the switch.

FIG. 54 is a diagrammatic plan view of the driver.

FIG. 55 is a central longitudinal section taken through the driver.

FIG. 56 is a rear end view of the driver.

FIG. 57 is a fragmentary enlarged elevation of the detent wheel, constituting a portion of the driver.

FIG. 58 is a front elevation of the shaft for the rotary vacuum-electric switch.

FIG. 59 is a side elevation of the shaft.

FIG. 60 is a diagrammatic rear elevation of a partial assembly comprising the driver with its pinion gear, the valve carriage, the spacer, the idler gear, and the electrical carriage for the switch.

FIG. 61 is a front elevational view of a spacer constituting a component of the rotary vacuum-electric switch.

FIG. 62 is a top plan view of the spacer.

FIG. 63 is a right-hand side view of the spacer.

FIG. 64 is a left-hand elevational section, taken centrally through the spacer.

FIG. 65 is a rear elevational view of the spacer.

FIG. 66 is a horizontal section, taken generally along the line 66—66 in FIG. 61.

FIG. 67 is a front elevational view of an electrical carriage for the rotary vacuum-electric switch.

FIG. 68 is a top plan view of the electrical carriage.

FIG. 69 is a right-hand side view of the electrical carriage.

FIG. 70 is a horizontal section taken along line 70—70 in FIG. 67.

FIG. 71 is a left-hand side view of the electrical carriage.

FIG. 72 is a vertical section taken centrally through the electrical carriage.

FIG. 73 is a rear elevational view of the electrical carriage.

FIG. 74 is a front elevational view of a fan contactor for the rotary vacuum-electric switch.

FIG. 75 is a top plan view of the fan contactor.

FIG. 76 is a bottom plan view of the fan contactor.

FIG. 77 is a right-hand side view of the fan contactor.

FIG. 78 is a left-hand side view of the fan contactor.

FIG. 79 is a rear elevational view of the fan contactor.

FIG. 80 is a front elevational view of a clutch contactor for the rotary vacuum-electric switch.

FIG. 81 is a top plan view of the clutch contactor.

FIG. 82 is a horizontal section through the clutch contactor, as viewed from below.

FIG. 83 is a right-hand elevational section of the clutch contactor.

FIG. 84 is a left-hand side view of the clutch contactor.

FIG. 85 is a rear elevational view of the fan contactor.

FIG. 86 is a table showing typical functions of the mode selector vacuum switch portion of the rotary vacuum-electric switch for all of the various detented positions of the control shaft.

FIG. 87 is a table showing typical functions of the mode selector electric switch portion of the rotary vacuum-electric switch for all of the detented positions of the control shaft.

DETAILED DESCRIPTION OF ILLUSTRATIVE EMBODIMENT

Figure 3:
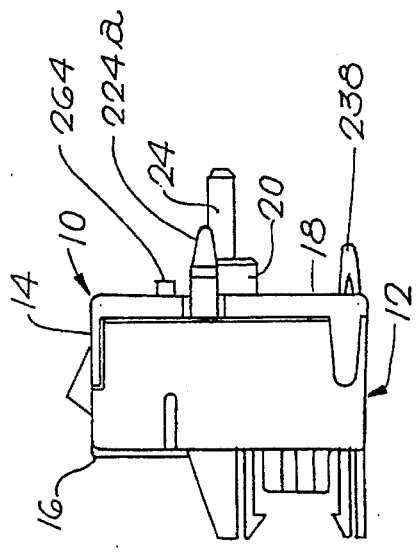
FIG. 3 is a side elevational view of the switch of FIG. 1.
Figure 5:
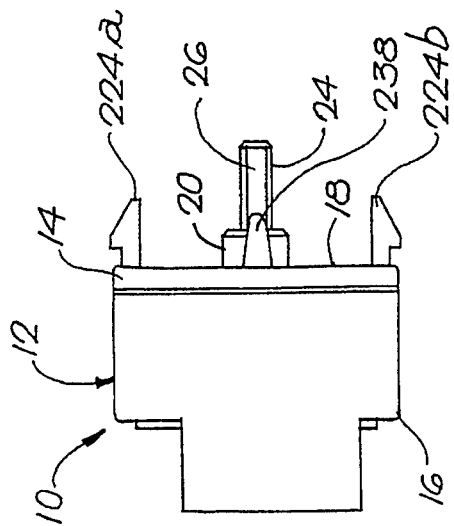
FIG. 5 is a bottom plan view of the switch.
Figure 4:
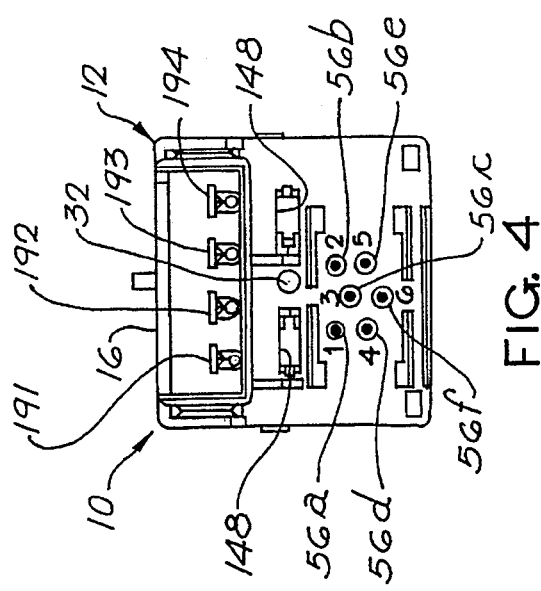
FIG. 4 is a rear elevational view of the switch.

As just indicated, the drawings illustrate a rotary vacuum-electric switch 10 (FIGS. 1–5) having a housing 12 comprising front and rear components which will be referred to as a case 14 and a cover 16, each of which is preferably molded in one piece from a suitable resinous plastic material, such as glass-fiber-reinforced nylon, for example. The case 14 (FIGS. 6–12*a*) has a front wall 18 formed with a forwardly projecting substantially cylindrical boss 20 having an axial opening 22 which is also substantially cylindrical, for receiving a rotatable control shaft 24, preferably made of metal. The shaft 24 is substantially cylindrical but is formed with a longitudinal flat surface 26 whereby the front end portion of the shaft may be keyed to a knob or the like, not shown, for rotating the shaft.

As shown in FIG. 59, the shaft 24 has a knurled rear end portion 27 which is press-fitted into a blind axial opening 28 (FIG. 53) in a driver 30, preferably molded in one piece from a suitable resinous plastic material, such as glass-reinforced nylon, for example. The illustrated opening 28 in the driver 30 is generally cylindrical but is formed with a longitudinal flat surface 29 to mate snugly with the flat surface 26 on the shaft 24, whereby the correct angular orientation is established and maintained between the driver 30 and the shaft 24. Thus, the driver 30 is securely connected to the rear end portion 27 of the shaft 24 so that the driver 30 is rotatable with the shaft 24. The rear end of the driver 30 is formed with a stub shaft 32 (FIGS. 54–56) which is coaxial with the control shaft 24 and is rotatably received in a substantially cylindrical opening 34 (FIG. 35) in the cover 16, whereby the cover affords a bearing for the stub shaft 32.

The driver 30 is formed with a pinion gear 36 which meshes with a linear gear rack 38 formed along the upper edge of a valve carriage 40 (FIGS. 32, 33, 38–45 and 60), supported for translatory movement in the housing 12. As illustrated, the valve carriage 40 is movable in a horizontal direction. The valve carriage 40 is preferably molded in one piece from a suitable resinous plastic material, such as glass-fiber-reinforced nylon, for example. The illustrated valve carriage 40 is generally flat and plate-like in shape and is formed with a rearwardly facing cavity 42 for snugly receiving a vacuum distribution valve 44 (FIGS. 46–50) which is also generally flat and plate-like in form and is preferably molded in one piece from a suitable soft resilient rubber-like material, such as silicone rubber, for example. The valve 44 has a substantially flat rear surface 46 from which a valving ridge or rib 48 projects rearwardly. The valving ridge 48 forms a closed perimeter of irregular shape. As shown, the valve 44 is in a vertical position and is translatable horizontally with the valve carriage 40.

As shown in FIGS. 18–25, 32 and 33, the cover 16 is formed with a rear wall portion 50 having a flat forwardly facing valve surface 52 along which the valving ridge 48 of the valve 44 is slidable. As illustrated, the rear wall portion 50 of the cover 16 is formed with six vacuum distribution ports 54*a*, 54*b*, 54*c*, 54*d*, 54*e* and 54*f* which open forwardly along the flat valve surface 52 and are adapted to cooperate with the irregularly shaped valving ridge 48 to produce a predetermined series of valving functions when the valve 44 is translated along its predetermined path with the valve carriage 40. The ports 54*a*–54*f* open rearwardly into rearwardly projecting tubular nipples 56*a*, 56*b*, 56*c*, 56*d*, 56*e* and 56*f*, respectively, adapted to receive a vacuum distribution connector, whereby vacuum is supplied to one or more of the nipples from a suitable vacuum source, such as the intake manifold of an automotive engine, and whereby the vacuum is distributed to various vacuum motors for operating the doors or dampers which perform the desired valving functions in the air distribution system of the automotive heating, ventilating and air conditioning system. It will be understood that the number and arrangement of the vacuum distribution ports 54*a*–54*f* may be varied to achieve a variety of vacuum distribution functions. The configuration of the rearwardly projecting valving ridge 48 on the valve 44 may also be varied to achieve various vacuum distribution functions.

Figure 33:
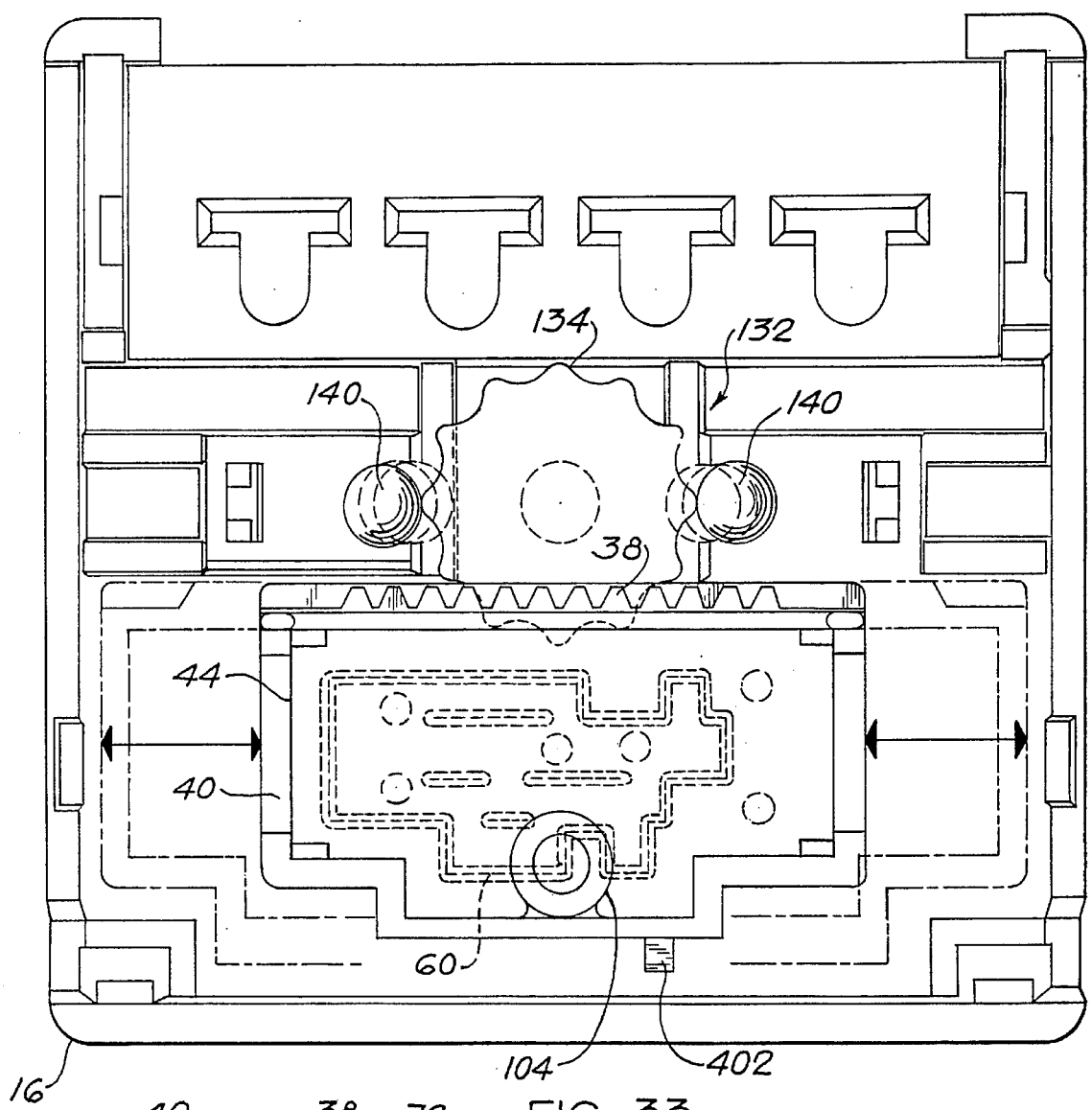
FIG. 33 is a somewhat diagrammatic front elevation of a partial assembly comprising the cover, the detent wheel, the detent balls, the valve carriage and the valve for the switch.
Figure 48:
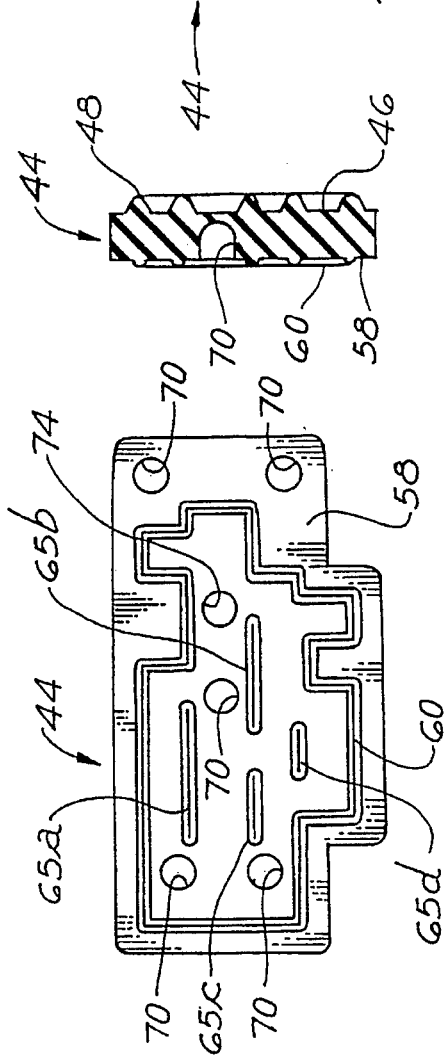
FIG. 48 is a front elevation of the valve.
Figure 49:
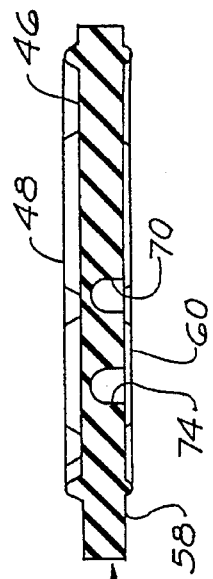
FIG. 49 is a horizontal section taken through the valve as viewed from below.
Figure 50:
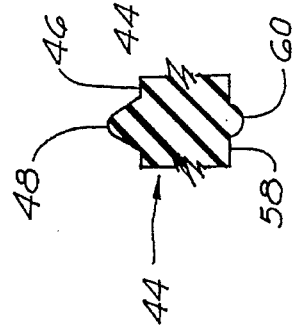
FIG. 50 is a fragmentary enlarged section taken through the valve and corresponding to a portion of FIG. 47.

As shown in FIGS. 33 and 48, the rubber valve 44 has a substantially flat front surface 58 which faces into the cavity 42 and is formed with a forwardly projecting ridge 60 having a closed irregular perimeter, aligned with the valving ridge 48 and corresponding in shape to a mirror image of the valving ridge 48. The cavity 42 in the valve carriage 40 has a rearwardly facing substantially flat surface 62 which is engaged by the ridge 60. The effect of the soft resilient forwardly projecting ridge 60 is to increase the compliance or compressibility of the silicone rubber valve so as to enhance the ability of the valve 44 to act as a soft resilient spring member for the valving ridge 48, as disclosed and claimed in the Halstead and Black U.S. Pat. No. 4,448,390, issued May 15, 1984 to the same assignee to which the present invention is assigned.

In addition to the valving ridge 48 with its closed irregular perimeter, the illustrated valve 44 is formed with rearwardly projecting ridges 64*a*, 64*b*, 64*c* and 64*d* within the perimeter of the valving ridge 48 for slidably engaging the flat valve surface 52 to prevent excessive distortion of the rubber valve 44 due to the vacuum which is supplied to the vacuum distribution passage 66 within the perimeter of the valving ridge 48 and between the flat rear surface 46 on the valve 44 and the flat valve surface 52 on the rear wall portion 50 of the cover 16. The front surface 58 of the valve 44 is formed with forwardly projecting ridges 65*a*, 65*b*, 65*c* and 65*d* which are aligned with the ridges 64*a*, 64*b*, 64*c* and 64*d* and are configured as a mirror image thereof.

The silicone rubber valve 44 is confined in the rearwardly facing cavity 42 formed in the valve carriage 40, so that the valve 44 is translated along the predetermined path of the valve carriage 40. To increase the transmission of driving effort between the valve carriage 40 and the rubber valve 44, and to prevent creeping of the valve 44 relative to the valve carriage 40, the illustrated valve carriage 40 is formed with a plurality of stubby pins 68 which project rearwardly from the valve carriage 40 within the rearwardly facing cavity 42. The pins 68 are snugly receivable in blind openings 70 formed in the substantially flat front surface 58 of the rubber valve 44. The illustrated valve carriage 40 is formed with five of the pins 68, for reception in five of the blind openings 70 in the rubber valve 44. The pins 68 and blind openings 70 are arranged with four of the pins 68 near the four corners of the rubber valve 44 and the fifth pin 68 substantially at the center of the valve 44.

Figure 42:
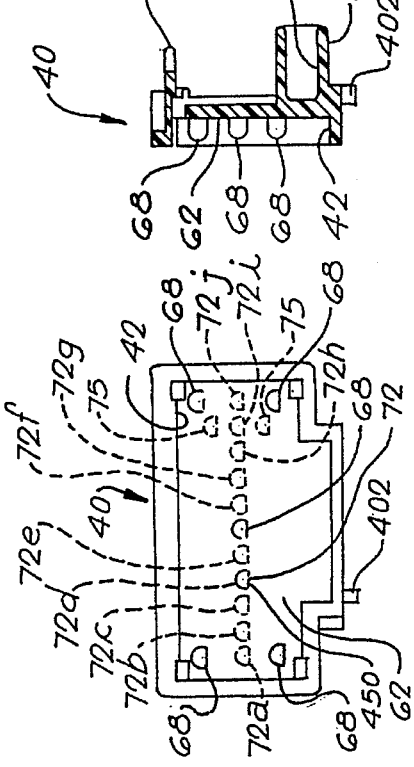
FIG. 42 is a somewhat diagrammatic rear view of the valve carriage, showing several alternative locations of a keying pin.
Figure 44:
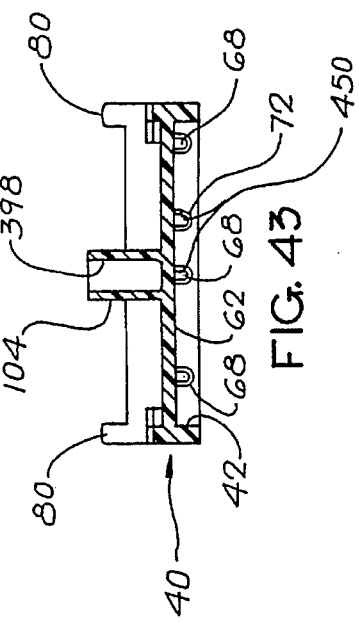
FIG. 44 is a fragmentary enlarged rear elevation showing one of the locating pins on the valve carriage.
Figure 46:
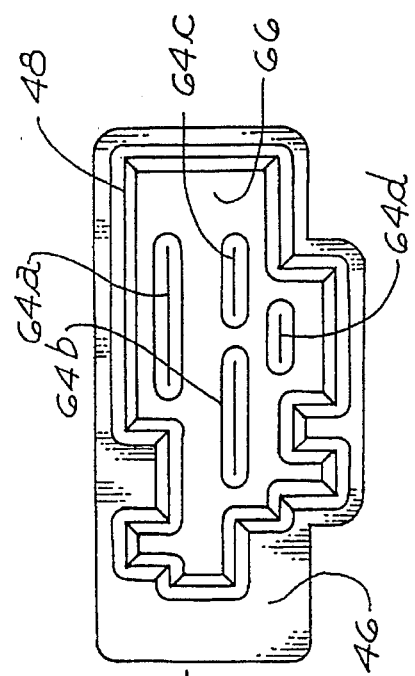
FIG. 46 is an enlarged rear elevation of the valve for the switch.
Figure 47:
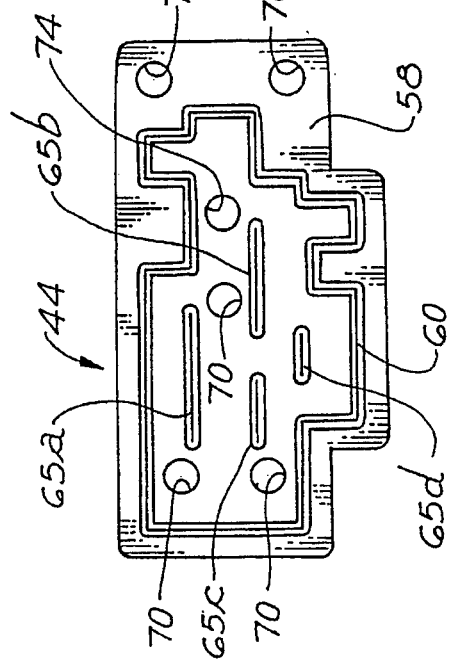
FIG. 47 is a vertical section taken through the valve as viewed from the left.

The configuration or perimeter of the valving ridge 48 can be varied to achieve a variety of vacuum valving functions. Thus, it should be understood that the illustrated valve 44 is only one of a family of valves for use with various vehicular air control systems which always provide heating and ventilation and may also provide air conditioning. The illustrated valve carriage 40 is formed with a sixth rearwardly projecting stubby pin 72 which functions as a keying pin or element and is receivable in a keyway element comprising a sixth blind opening 74 in the front side of the rubber valve 44. The keying pin 72 and the keying opening 74 are located in one of a plurality of predetermined keying locations. As shown in FIG. 42, provision is made for ten such keying locations 72a–72j for the keying pin 72 and ten corresponding locations for the keying opening 74. In addition, two alternate locations 75 are provided for two of the pins 68.

As previously indicated, the configuration of the ridges 48 and 60 can be modified to adapt the rotary vacuum-electric switch 10 for a wide variety of applications in different automotive vehicles. For some applications, the construction of the rotary vacuum-electric switch can be adapted to provide vacuum switching functions for heating and ventilating only. For other applications, the construction of the switch 10 can be adapted to produce vacuum switching functions for heating, ventilating and air conditioning. For each unique configuration of the valving ridges 48 and 60, the keying pin 72 is positioned in a unique location selected from the ten available locations 72a–72j. Similarly, the keying opening 74 is positioned in a corresponding unique location selected from the ten available locations. This keying system provides keying means to insure that each unique valve 44 will be correctly mated with the corresponding unique valve carriage 40, and to prevent the assembly of an incorrect valve with the valve carriage.

Means are provided in the housing 12 for guiding the valve carriage 40 for translatory movement along its predetermined path, such guiding means being illustrated in FIGS. 35 and 60–66 as comprising a spacer 76 having a rearwardly facing groove 78 for receiving a ridge 79 and a pair of tabs 80 aligned therewith, such ridge and tabs projecting forwardly on the valve carriage 40 and being slidable along the groove 78. As shown, the spacer 76 is a plate-like member positioned in the housing 12 in front of the valve carriage 40. The spacer 76 is preferably molded in one piece from a suitable resinous plastic material.

The spacer 76 is retained between the case 14 and the cover 16 and thus is mounted in a fixed position within the housing 12. In effect, the spacer 76 provides a stationary partition wall extending transversely across the interior of the housing 12.

Means are provided for resiliently biasing the valve carriage 40 rearwardly within the cover component 16 of the housing 12, such means being illustrated as a bow shaped leaf spring 82, mounted on the valve carriage 40 so as to be translatable therewith. The leaf spring 82 is compressed between the spacer 76 and the valve carriage 40 so that the valve carriage 40 and the valve 44 are biased rearwardly whereby the valving ridge 48 on the valve 44 is pressed into slidable sealing engagement with the flat forwardly facing valve surface 52 on the rear wall portion 50 of the cover 16. The central portion of the leaf spring 82 is slidable along the rear side of the spacer 76, which is illustrated as being formed with a pair of rearwardly projecting rounded ridges or ribs 84 extending along the linear path of movement of the valve carriage 40. The ridges or ribs 84 reduce the sliding friction between the leaf spring 82 and the spacer 76.

Figure 34:
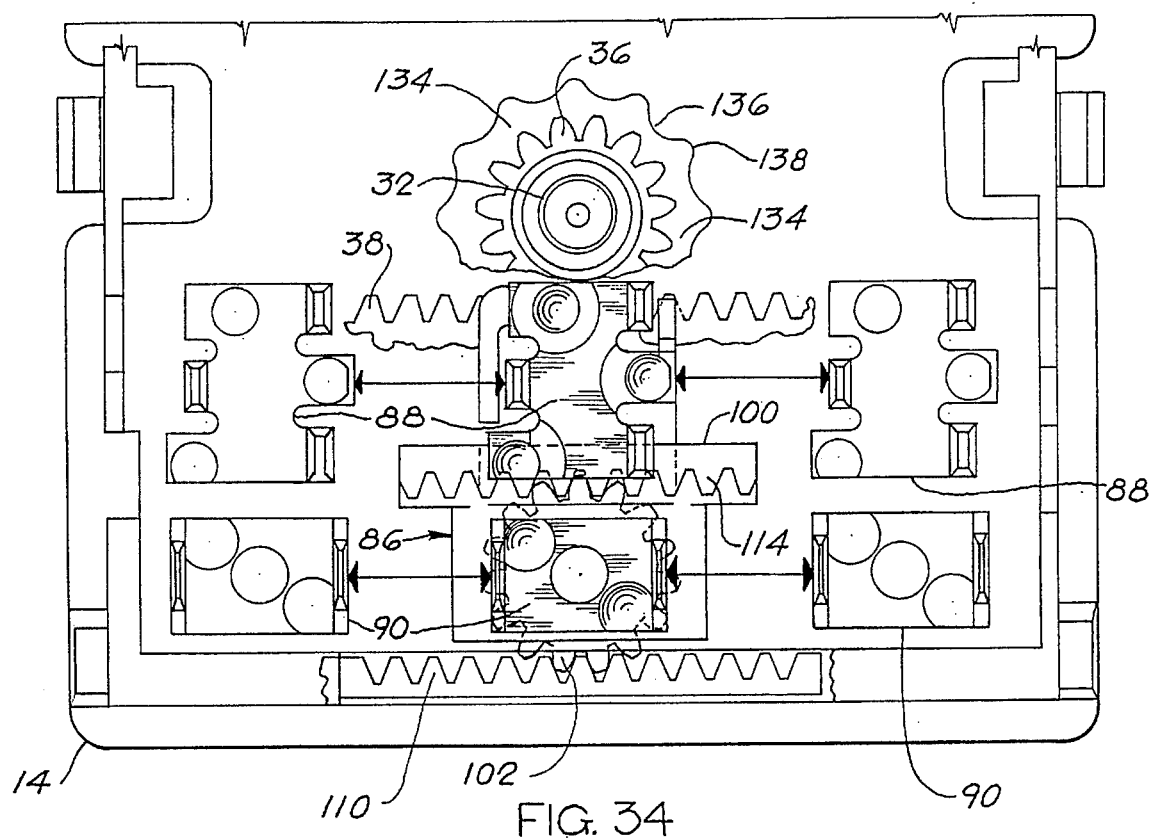
FIG. 34 is a somewhat diagrammatic front elevation, with certain portions broken away, of a partial assembly comprising the case, the shaft, the pinion gear on the driver, the electrical carriage, the fan contactor and the clutch contactor for the switch.
Figure 35:
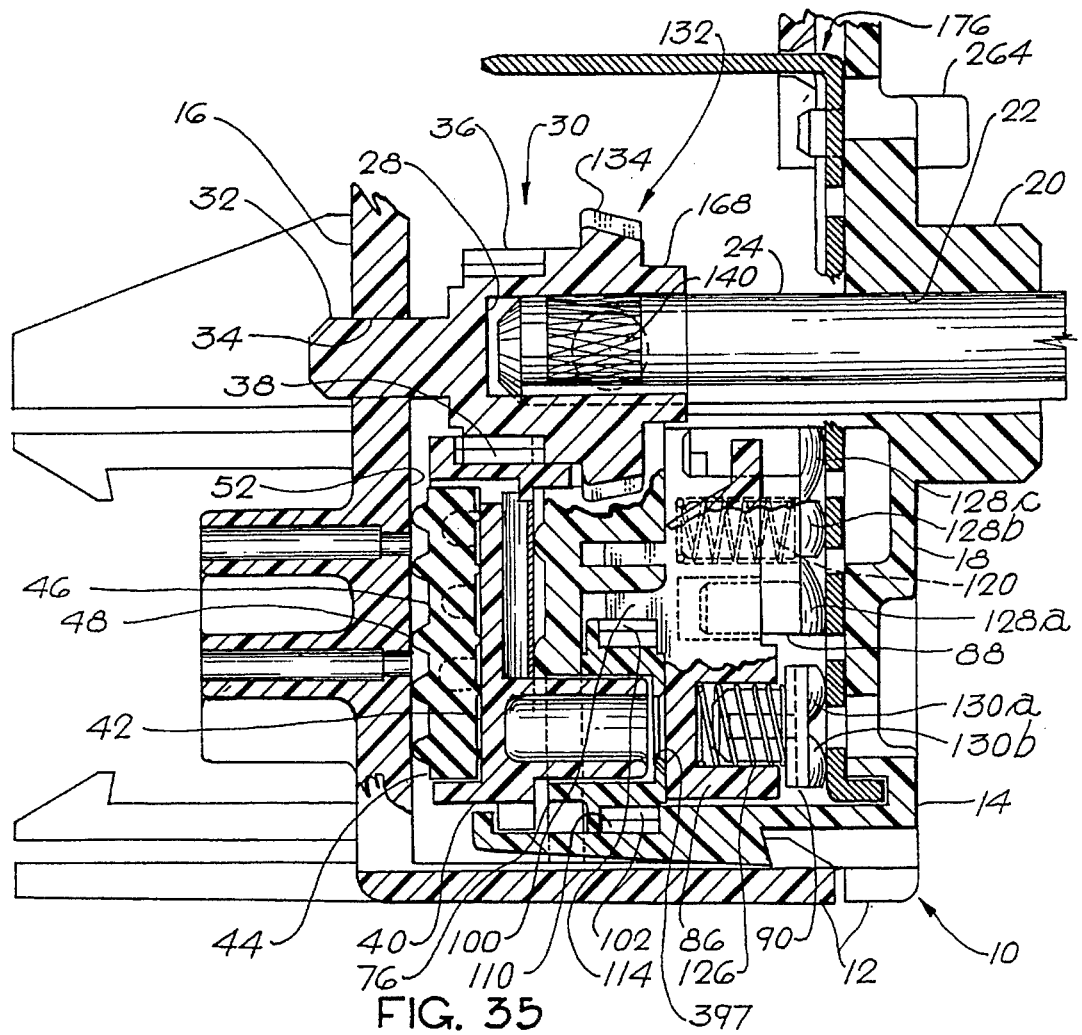
FIG. 35 is a somewhat diagrammatic side elevational section of a partial assembly comprising the case, the cover, the valve, the valve carriage, the valve carriage spring, the spacer, the idler gear, the electrical carriage, the fan contactor and spring, the clutch contactor and spring, and the terminal cluster for the switch.
Figure 35A:
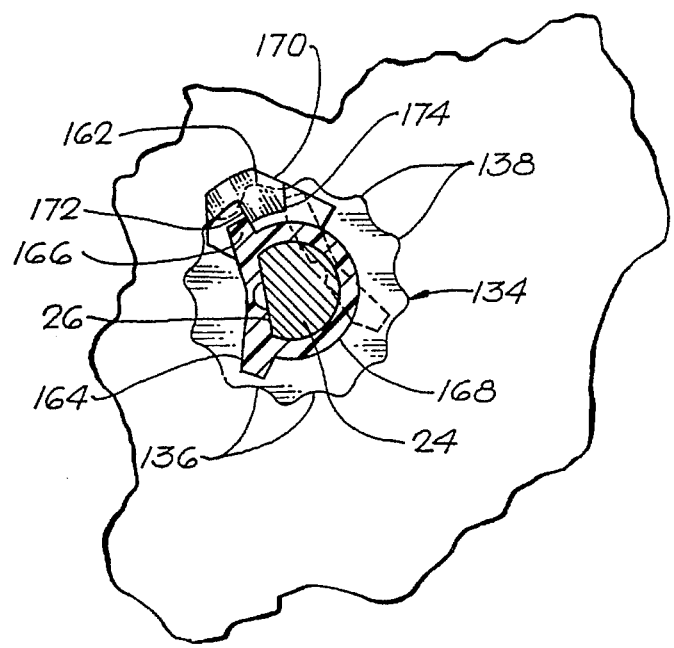
FIG. 35a is a fragmentary enlarged vertical section taken transversely through the control shaft and the hub of the driver and showing the stop elements for limiting the angular range of rotation of the control shaft.
Figure 36:
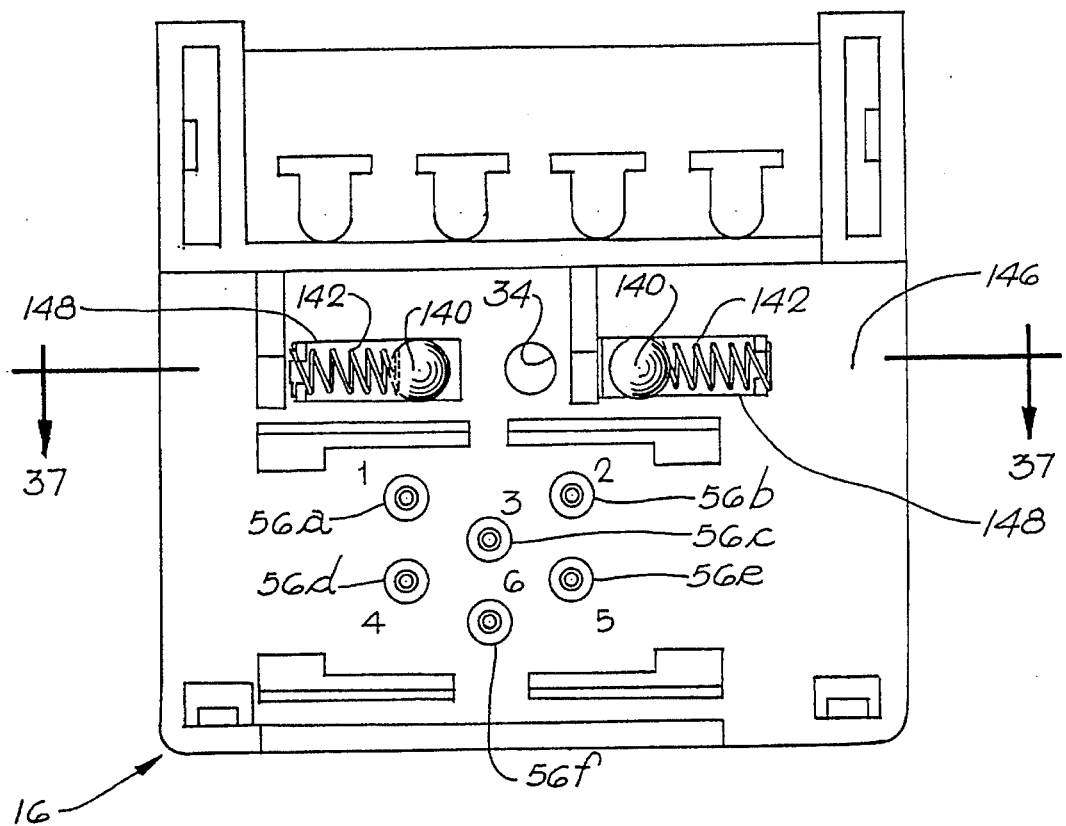
FIG. 36 is a somewhat diagrammatic enlarged rear view of a partial assembly, comprising the cover, the detent balls, and the detent springs for the switch.
Figure 37:
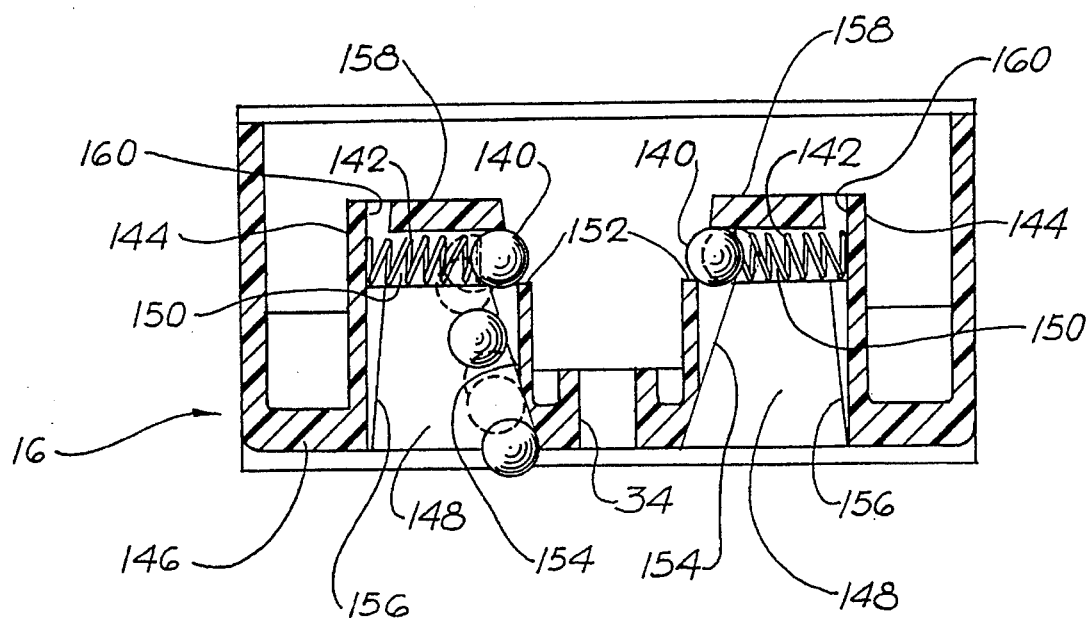
FIG. 37 is a somewhat diagrammatic horizontal section taken generally along the line 37—37 in FIG. 36.
Figure 40:
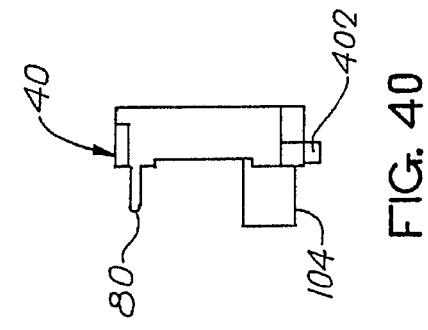
FIG. 40 is a right hand side view of the valve carriage.
Figure 39:
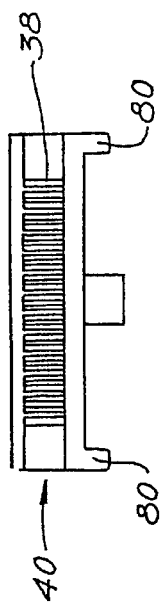
FIG. 39 is a plan view of the valve carriage.
Figure 38:
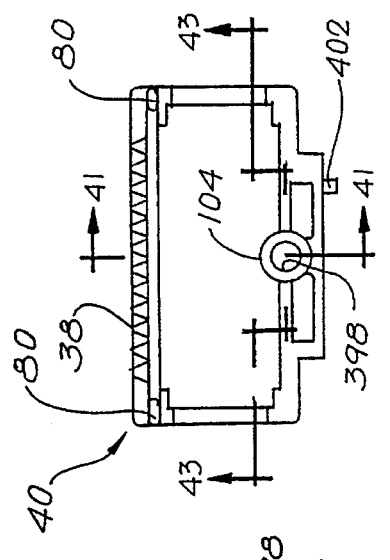
FIG. 38 is a front elevation of the valve carriage for the switch.

In addition to the vacuum valve means, already described, the rotary vacuum-electric switch 10 also comprises electrical switching means, illustrated in FIGS. 34 and 35 as including an electrical carriage 86 on which contactors 88 and 90 are mounted. In this instance, the contactor 88 will be referred to as the fan contactor, because the contactor 88 is employed to energize and de-energize the electrical motor which drives the fan in the air control system of the automotive vehicle. The contactor 90 will be referred to as the clutch contactor, because the contactor 90 is employed to energize and de-energize the electrical clutch which is adapted to drive the air conditioning compressor. The electrical carriage 86 is made of an electrically insulating material and preferably is molded in one piece from a suitable resinous plastic material, such as glass-fiber-reinforced nylon, for example.

Additional guiding means are provided for guiding the electrical carriage for translatory movement within the housing 12, along a predetermined path which is parallel with the path of the valve carriage 40, such guiding means being illustrated in FIGS. 35, 61 and 64 as comprising a forwardly facing guide groove 92 and a forwardly projecting guide flange or rail 94, formed on the front side of the spacer 76. The electrical carriage 86 is formed with complementary guiding means, including a rearwardly projecting flange or tab 96, slidably received in the guide groove 92, and a rearwardly facing groove or channel 98, slidably receiving the guide flange 94 on the spacer 76. The channel 98 is formed between the tab 96 and an elongated flange 100 projecting rearwardly on the electrical carriage 86. As illustrated in FIG. 35, the electrical carriage 86 is slidable in a horizontal direction along the front side of the spacer 76.

The electrical carriage 86 is adapted to be translated, in response to the rotation of the shaft 24, by drive means, illustrated as comprising an idler gear 102 which is rotatably supported by a bearing 104, formed in one piece with the valve carriage 40 and projecting forwardly therefrom, through a horizontal guide slot 106 in the spacer 76. It will be seen that the bearing 104 is in the form of a substantially cylindrical stub shaft, projecting forwardly from the valve carriage 40. The idler gear 102 is positioned in front of the spacer 76 and is formed with a substantially cylindrical axial opening 108 (FIG. 60) for rotatably receiving the bearing or stub shaft 104. It will be understood that the idler gear 102 is translated along with the valve carriage 40. The idler gear 102 is preferably molded in one piece from a suitable resinous plastic material, such as glass-fiber-reinforced nylon, for example.

Additional drive means are provided to produce rotation of the idler gear 102 when it is translated by the valve carriage 40, such means being illustrated as comprising a linear gear rack 110, formed on the interior of the case 14 along a side wall 112 thereof, such side wall being the lower side wall, as illustrated in FIGS. 10, 11, 31 and 35. The idler gear 102 meshes with the linear gear rack 110, so that the idler gear 102 is caused to rotate as it is translated with the valve carriage 40. The idler gear 102 rolls along the stationary gear rack 110 when the idler gear is translated.

As shown in FIGS. 34, 35, 60, 70 and 73, the electrical carriage 86 is formed with a linear gear rack 114, molded in one piece therewith and extending along the lower side of the elongated flange 100 on the electrical carriage 86. The linear gear rack 114 on the electrical carriage 86 is substantially parallel with the stationary linear gear rack 110 on the case 14. The linear gear racks 110 and 114 mesh with diametrically opposite portions of the idler gear 102. By virtue of the gear drive comprising the idler gear 102 and the linear gear racks 110 and 114, the electrical carriage 86 is translated by an amount which is twice the translatory movement of the valve carriage 40.

As previously indicated, the fan contactor 88 and the clutch contactor 90 are mounted on the front side of the electrical carriage 86. The contactors 88 and 90 are made of an electrically conductive metal, such as copper, for example.

Means are provided to guide the fan contactor 88 for movement in a forward and rearward direction on the electrical carriage 86, such means comprising three prongs 116a, 116b and 116c which are bent rearwardly from the contactor 88 and are slidably received in corresponding slots 118a, 118b and 118c, formed in the electrical carriage 86. Resilient spring means 120 are provided between the electrical carriage 86 and the fan contactor 88 for biasing the fan contactor 88 forwardly relative to the carriage. As shown, the spring means 120 are in the form of a compression coil spring.

Similarly, means are provided for guiding the clutch contactor 90 for sliding movement in a forward and rearward direction on the electrical carriage 86, such means being illustrated as prongs 122a and 122b bent rearwardly from the clutch contactor 90 and slidably received in slots 124a and 124b in the electrical carriage 86. Resilient means such as the illustrated compression coil spring 126 are mounted on the electrical carriage 86 between the carriage and the clutch contactor 90 for biasing the contactor forwardly relative to the carriage.

The illustrated fan contactor 88 is formed with three forwardly projecting contact points 128a, 128b and 128c which are spherically rounded. The illustrated clutch contactor 90 is formed with two forwardly projecting spherically rounded contact points 130a and 130b.

The control shaft 24 is rotatable to a plurality of angularly spaced positions and is adapted to be detained in such positions by detent means 132, illustrated as comprising a detent wheel 134 which is preferably molded in one piece with the driver 30. The detent wheel 134 is formed with a plurality of angularly spaced detent notches 136. As shown, the detent notches 136 are spaced apart by substantially 30 degrees. Thus, there are twelve of the detent notches 136 in the detent wheel 134. Rounded peaks or teeth 138 are formed on the detent wheel 134 between the successive detent notches 136 which are also rounded in shape.

The detent means 132 also comprise one or more detent elements which are resiliently biased into engagement with the detent wheel 134, such detent elements being illustrated as comprising a pair of detent balls 140 which are engageable with the detent wheel 134 at diametrically opposite locations. The detent balls 140 are resiliently biased against the detent wheel by a pair of compression coil springs 142, each of which is compressed between one of the balls 140 and the cover component 16 of the housing 12.

Means are provided for receiving and supporting the detent balls 140 and the associated coil springs 142 in such a manner that the balls 140 and the springs 142 may be assembled into the cover component 16 of the housing 12 from the outside of the housing 12, either before or after the other components of the rotary vacuum-electric switch 10 have been assembled. As shown in FIGS. 18, 24, 25 and 37, the cover 16 is formed with a pair of tunnel structures 144, each of which is adapted to receive and support one of the detent balls 140 and one of the springs 142. Each of the tunnel structures 144 projects forwardly from a rear wall portion 146 of the cover 16 and is formed with a deep forwardly extending tunnel or slot 148 through which one of the balls 140 and one of the springs 142 can be inserted into a transverse passage 150, disposed in the front portion of the corresponding tunnel structure 144, opposite the detent wheel 134. At the radially inner end of each transverse passage 150, the corresponding tunnel structure 144 is formed with an opening 152 which is of a size comparable with the size of each detent ball 140, but slightly smaller, so that only a portion of the detent ball projects radially inwardly through the opening 152 for engagement with the detent wheel 134. Each transverse passage 150 is of a size comparable with the size of the detent ball 140, but slightly larger in size, so that the detent ball is freely movable along the transverse passage 150.

Along the radially inner portion of each tunnel or slot 148, the tunnel structure 144 is formed with first ramp means 154 sloping radially outwardly and forwardly, to facilitate the insertion of the corresponding detent ball 140 into the transverse passage 150 and to assist in retaining the detent ball 140 in the transverse passage 150. On the radially outer side of each tunnel or slot 148, the tunnel structure 144 is formed with second radially inwardly and forwardly sloping ramp means 156 to facilitate the insertion of the corresponding coil spring 142 and to assist in retaining the coil spring in the transverse passage 150. Each tunnel structure 144 includes a front wall portion 158 formed with an opening or slot 160, opposite the second ramp means 156. When the corresponding coil spring 142 is installed in the transverse passage 150, the outer end portion of the spring is visible through the opening 160, assuming the cover 16 has not yet been assembled with the case 14. Each detent ball 140 and the corresponding coil spring 142 are visible through the corresponding tunnel 148, when the detent ball 140 and the spring 142 are installed in the transverse, passage 150.

Thus, the tunnel structures 144 and the tunnels 148 afford means whereby the detent balls 140 and the springs 142 can be assembled with the cover 16, either before or after the cover 16 is assembled with the case 14. Moreover, the detent balls 140 and the coil springs 142 are clearly visible through the tunnels 148, so that an inspector can make sure that the detent balls and the springs are installed in their proper places, after the rotary vacuum-electric switch 10 has been fully assembled.

The rotary vacuum-electric switch 10 includes stop means for limiting the range of angular rotation of the control shaft 24, such stop means including a stationary stop lug 162 (FIGS. 9 and 30) on the case 14 and first and second stop tabs 164 and 166 on the driver 30 which is rotatable with the shaft 24. As shown in FIG. 53, the stop tabs 164 and 166 project radially outwardly from a generally cylindrical boss or hub 168 which extends forwardly from the detent wheel 134 on the driver 30. It will be understood that the tabs 164 and 166 and the hub 168 are molded in one piece with the driver 30.

As shown in FIG. 10, the stop lug 162 extends rearwardly from a partial boss or post 170 extending rearwardly into the case 14 from the front wall 18 thereof. The partial boss 170 is arcuate in shape and may be regarded as a rearward extension of the forwardly projecting substantially cylindrical boss 20. The stop lug 162 has first and second radial sides 172 and 174 which are engageable by the stop tabs 164 and 166 so as to limit the range of rotary movement of the shaft 24. The range of angular movement is determined by the angular spacing between the tabs 164 and 166 and also the angular spacing between the radial sides 172 and 174 of the stop lug 162.

As previously indicated, the illustrated rotary vacuum-electric switch 10 may be one version of a family of similar but specifically different vacuum-electric switches for use on various automotive vehicles having different optional features such as air conditioning, for example. To produce various modified versions of the switch 10, the case 14 may be modified so as to change the angular width of the stop lug 162. In this way, the range of angular rotation of the shaft 24 may be changed to accommodate the needs of various automotive vehicles.

Figure 31:
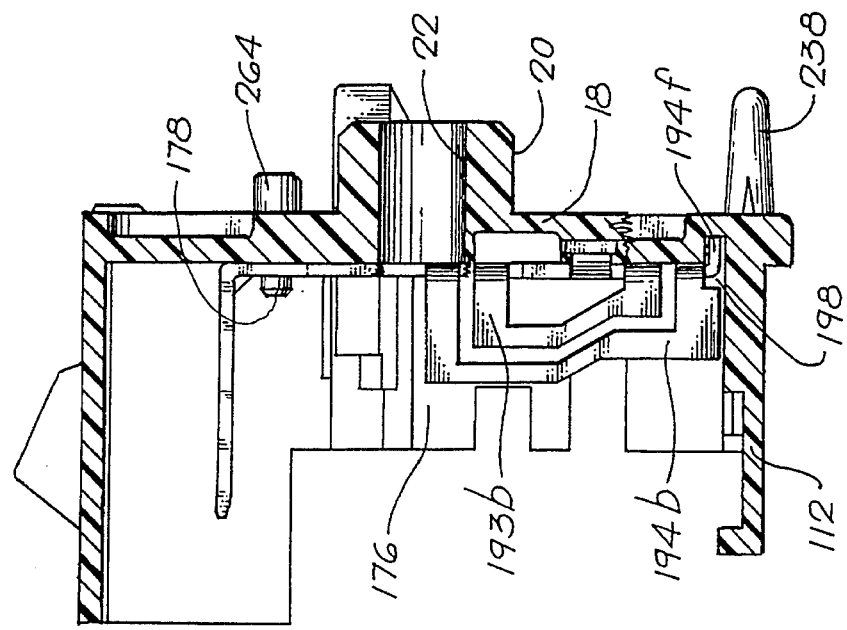
FIG. 31 is central vertical section taken through the assembly of FIG. 30, but showing the terminal cluster in side elevation.
Figure 30:
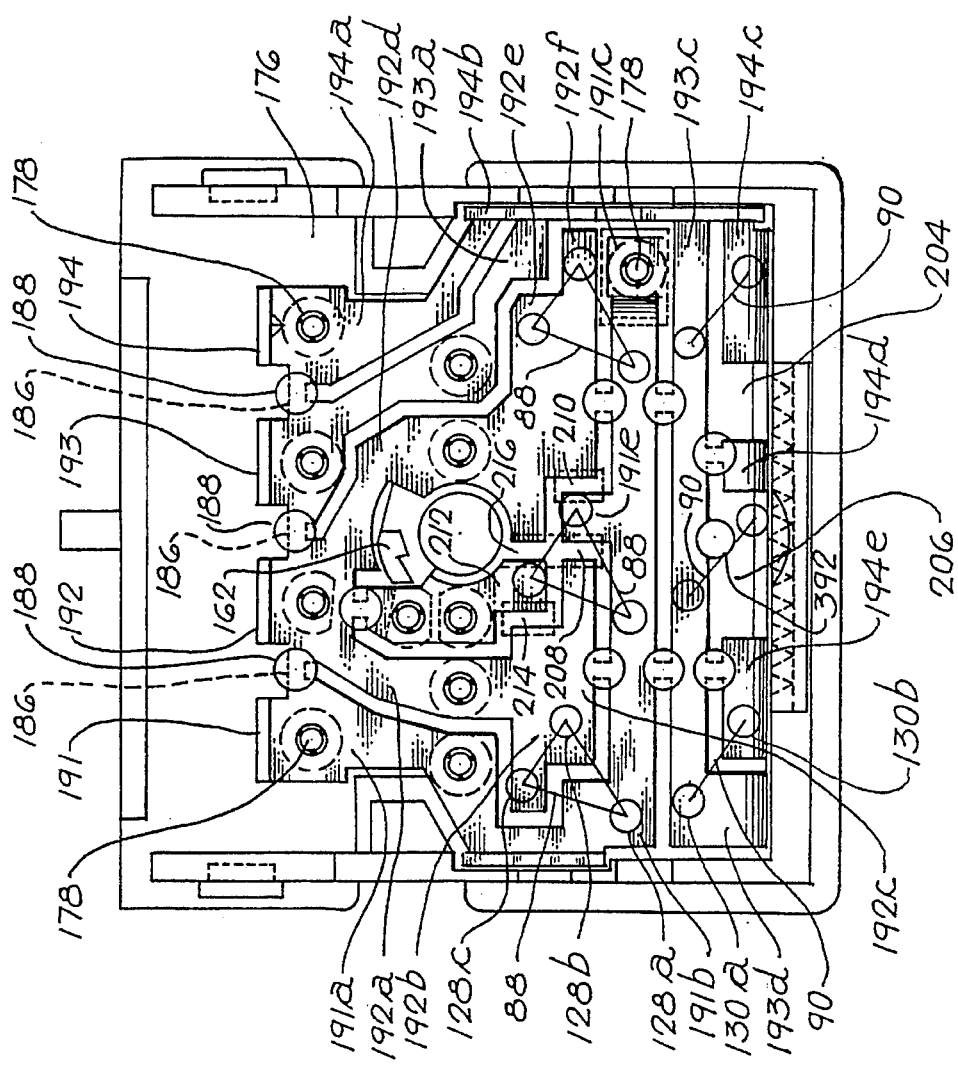
FIG. 30 is a rear elevational view of the case for the switch, with the terminal cluster installed and showing the fan contactor and the clutch contactor diagrammatically.

As described previously, the rotation of the control shaft 24 to its various detented positions produces translatory movement of the electrical carriage 86 as well as the fan contactor 88 and clutch contactor 90 which are mounted on the carriage 86. Such movement is in a horizontal direction, as shown in FIG. 34. The fan and clutch contactors 88 and 90 are selectively engageable with a plurality of fixed contact means which are provided by a terminal cluster 176, adapted to be mounted on the rear side of the front wall 18 of the case 14, as shown in FIGS. 30 and 31. Initially, the terminal cluster 176 is stamped or otherwise formed in one piece from a suitable electrically conductive sheet metal such as pre-tinned copper, for example. The terminal cluster 176 is shown separately in FIGS. 26–29.

The terminal cluster 176 is adapted to be secured to the rear side of the front wall 18 by suitable means, illustrated in FIG. 30 as comprising a plurality of mounting pins 178, molded in one piece with the case 14 and projecting rearwardly from the front wall 18 thereof. In this instance, there are eleven of the pins 178 which are adapted to be received in eleven holes or openings 180 punched or otherwise formed in various portions of the terminal cluster 176. In order to retain the terminal cluster 176 on the pins 178, the terminal cluster 176 is formed with a plurality of tangs or points 182 (FIG. 29a) projecting into each of the holes 180. When the terminal cluster 176 is pressed into its assembled position in engagement with the rear side of the front wall 18, the tangs 182 dig into the resinous plastic mounting pins 178 so that the terminal cluster is securely retained on the mounting pins. As shown, three of the tangs 182 project into each of the holes 180 in the terminal cluster 176.

Recesses 184 are formed in the rear side of the front wall 18, around the respective mounting pins 178, to provide room for the shavings which are scraped from the pins 178 by the tangs 182 when the terminal cluster 176 is assembled with the case 14. The recesses 184 are either circular in shape or of a truncated circular shape, as shown in FIG. 9.

As will be described in detail presently, the terminal cluster 176 comprises a multiplicity of terminal prongs 191–194, conductors and fixed contact bars which initially are held together by a multiplicity of narrow webs or connecting elements 186, so that the terminal cluster 176 will initially have sufficient mechanical integrity to be assembled as a single unit on the rear side of the front wall 18, as described above. After the terminal cluster 176 has been mounted on the front wall 18 of the case 14, the webs 186 are severed or otherwise removed from the terminal cluster, as by a multiple punching operation carried out by a punch and die set having a multiplicity of punches and die openings. In order that the punches may have access to the webs 186, the front wall 18 of the case 14 is formed with a multiplicity of access holes or openings 188, opposite the webs 186. The illustrated terminal cluster 176 is formed with ten of the webs or connector elements 186. Correspondingly, the front wall 18 of the case 14 is formed with ten of the access holes or openings 188 through which the multiple punches can have access to the webs 186 so that they can be severed from the terminal cluster 176.

As shown in FIGS. 26–31, the terminal cluster 176 is formed with four rearwardly bent terminals or prongs 191, 192, 193 and 194, adapted to receive an electrical connector or receptacle, whereby the rotary vacuum-electric switch is connected to an energizing battery circuit and also to the blower or fan motor and the air conditioning clutch of the motor vehicle. In this case, the terminal 191 is adapted to be connected to the blower motor; the terminal 192, to the battery circuit; the terminal 193, to the air conditioning clutch; and the terminal 194, to the battery circuit.

In the illustrated terminal cluster 176, a conductor bar element 191a of irregular shape is connected between the first terminal 191 and a fixed contact bar element 191b which is elongated across nearly the entire width of the terminal cluster 176, so that the contact point 128a of the fan contactor 88 is slidably engaged with the contact bar element 191b throughout the entire range of movement of the fan contactor 88. The contact bar element 191b has a remote end portion 191c which is offset forwardly and is adapted to be received in a deep recess 191d in the front wall 18 of the case 14. One of the mounting pins 178 is located in the recess 191d and is recessed forwardly so that the mounting pin does not interfere with the movement of the fan contactor 88.

The terminal cluster 17e also includes a conductor bar 192a connected between the terminal 192 and a contact bar segment 192b which in turn is connected with an offset contact bar segment 192c. Another conductor bar element 192d is connected between the terminal 192 and a contact bar element 192e which in turn is connected to an offset contact bar element 192f.

A conductor bar element 193a is connected between the terminal 193 and a rearwardly bent conductor bar element 193b which in turn is connected to an elongated contact bar element 193c extending across nearly the entire width of the terminal cluster 176. Another bar portion 193d is connected to the remote or left-hand end of the contact bar element 193c as shown in FIG. 26, and is provided with a forwardly bent mounting flange 193e adapted to be received in a rearwardly opening groove 198 formed along the lowermost portion of the front wall 18 of the case 14, just above the lower wall 112 of the case 14. The mounting flange 193e is formed with a tang or barb 193f which digs into the resinous plastic material of the case 14 when the flange 193e is pressed into the groove 198, so that the flange 193e is securely retained in the groove 198.

A conductor bar element 194a is connected between the terminal 194 and a rearwardly bent conductor bar element 194b which in turn is connected to a contact bar segment 194c which is parallel with the contact bar element 193c. Two additional contact bar segments 194d and 194e are connected to the contact bar segment 194c by a forwardly bent conductor flange element 194*f* connected with all three contact bar segments 194*c*, 194*d* and 194*e*. The flange element 194*f* also acts as a mounting flange element adapted to be received in the previously mentioned groove 198 opening rearwardly along the lowermost portion of the front wall 18. The flange element 194*f* is formed with tangs or barbs 194*g* and 194*h*, adapted to dig into the resinous plastic material of the case 14 when the flange element 194*f* is pressed into the groove 198, so that the flange element 194*f* will be securely retained in the groove 198.

The upper contact point 130*a* on the clutch contactor 90 is slidable along the contact bar element 193*c* throughout the range of movement of the clutch contactor 90. The lower contact point 130*b* on the clutch contactor 90 is slidable successively into engagement with the contact bar segments 194*c*, 194*d* and 194*e*. It will be seen that there is a first gap 200 between the contact bar segments 194*c* and 194*d*, and a second gap 202 between the contact bar segments 194*d* and 194*e*. The gaps 200 and 202 are occupied by electrically non-conductive bosses 204 and 206 which project rearwardly from the resinous plastic material of the front wall 18 on the case 14. The bosses 204 and 206 are flush with the contact bar segments 194*c*, 194*d* and 194*e* so that the contact point 130*b* is smoothly slidable along the bosses 204 and 206 as the contact point 130*b* is moved across the gaps 200 and 202.

As shown in FIG. 30, the contact bar element 191*b* is formed with a tab or segment 191*e* which projects upwardly between the contact bar segments 192*c* and 192*f*. A first space or gap 208 is provided between the contact segment 191*e* and the contact segment 192*c*. A second space or gap 210 is provided between the contact segment 191*e* and the contact segment 192*f*.

As shown in FIG. 26, the terminal cluster 176 includes a sheet metal segment 212 which projects downwardly between the spaced contact segments 192*b* and 192*e*. A third space or gap 214 is provided between the contact segment 192*b* and the sheet metal segment 212. A fourth space or gap 216 is provided between the contact segment 192*e* and the sheet metal segment 212.

Initially, the sheet metal segment 212 is mechanically connected to the conductor bar element 192*a* by one of the webs 186. When the terminal cluster 176 is installed against the rear side of the front wall 18 on the case 14, the sheet metal segment 212 is securely mounted on the front wall 18 by the reception of two of the mounting pins 178 in two of the holes 180 which are formed in the sheet metal segment 212. As previously described, the tangs or points 182 on the sheet metal segment 212 dig into the corresponding pins 178 so that the segment 212 is securely mounted on the rear side of the front wall 18 on the casing 14. The web 186 between the segment 212 and the conductor bar element 192*a* is then severed or punched out, as previously described. Thus, the sheet metal segment 212 is isolated or insulated electrically, as shown in FIG. 30.

As shown in FIGS. 9 and 30, the rear side of the front wall 18 on the case 14 is formed with first, second and third deep recesses 218, 220 and 222 which are open rearwardly. When the terminal cluster 176 is mounted on the wall 18, the first recess 218 is located behind the space or gap 214. The second deep recess 220 is located behind the gaps 208 and 216. The third deep recess 222 is located behind the gap 210. The purpose of the deep recesses 218, 220 and 222 is to provide reservoirs for the metallic particles which are worn away from the various contact portions of the terminal cluster 176 by the electrical arcing which occurs in the gaps 208, 210, 214 and 216 during the operation of the switch 10 when the contact points 128*b* and 128*c* on the fan contactor 88 are moved across such gaps. The residue might otherwise build up sufficiently to cause short circuits between adjacent contact portions.

In FIG. 30, the fan contactor 88 and the clutch contactor 90 are shown diagrammatically in their extreme positions, at opposite ends of their range of movement. The contactors 88 and 90 are also shown in an OFF position, near the center of their range of movement. The contact point 128*a* on the fan contactor 88 engages the contact bar element 191*b* throughout the range of movement of the contact point 128*a*, so that the contactor 88 is connected to the terminal 191 at all times. In the left-hand extreme position of the contactor 88, as shown in FIG. 30, the contact point 128*b* engages the contact bar element 192*c*, while the contact point 128*c* engages the contact bar element 192*b*. In this way, the contactor 88 is connected to the terminal 192. Thus, the contactor forms a conductive bridge between the contact bar element 191*b* and the contact bar elements 192*b* and 192*c*, so that the circuit between the terminals 191 and 192 is closed or turned ON.

If the contactor 88 is moved to the right from its extreme left hand position, as shown in FIG. 30, the contact points 128*b* and 128*c* slide along the contact bar elements 192*c* and 192*b* until the contact points 128*b* and 128*c* simultaneously travel across the gaps 208 and 214, into engagement with the tabs or segments 191*e* and 212, respectively. In this stage, the fan contactor 88 is in the nearly central OFF position, previously mentioned above. In this position, the contact point 128*b* engages the tab or segment 191*e* which is connected to the contact bar element 191*b* and thence to the terminal 191. Thus, the contact points 128*a* and 128*b* are connected to the same terminal 191. The contact point 128*c* engages the sheet metal segment 212 which is electrically isolated or insulated. Thus, the contactor 88 no longer completes a closed circuit between the terminals 191 and 192.

As the contact points 128*b* and 128*c* simultaneously pass across the gaps 208 and 214, they simultaneously break contact with the contact bar elements 192*c* and 192*b*. In this way, the contact points 128*b* and 128*c* achieve a double break action, so that the wear and the electrical arcing are distributed between the contact points 128*b* and 128*c*, and also between the portions of the contact bar elements 192*c* and 192*b* which are adjacent the gaps 208 and 214. This double break action greatly increases the useful life of the switch 10.

If the fan contactor 88 is moved to the right from the OFF position, as shown in FIG. 30, the contact points 128*b* and 128*c* move into engagement with the contact bar elements 192*f* and 192*e*, respectively, so that a conductive circuit is re-established between the terminals 191 and 192. Accordingly, the fan motor circuit is ON or closed. This condition prevails throughout the remaining range of movement of the contactor 88 to its extreme right-hand position, as shown in FIG. 30.

If the contactor 88 is moved toward the left from its extreme right-hand position, the contact points 128*b* and 128*c* slide along the contact bar elements 192*f* and 192*e*, until the contact points 128*b* and 128*c* simultaneously move across the gaps 210 and 216 into engagement with the tabs or segments 191*e* and 212, respectively. The contact points 128*b* and 128*c* simultaneously break contact with the portions of the contact bar elements 192*f* and 192*e* adjacent the gaps 210 and 216, so that the double break action is again achieved. Thus, the wear and the electrical arcing are distributed between the contact points 128*b* and 128*c* and also between the contact bar elements 192*f* and 192*e*.

In the case of the clutch contactor 90, the contact point 130*a* is slidably engageable with the contact bar element 193*c* throughout the range of movement of the contact point 130*a*. Thus, the contactor 90 is electrically connected at all times to the terminal 193.

When the contactor 90 is in its extreme right-hand position, as shown in FIG. 30, the contact point 130*b* slidably engages the contact bar element 194*c*, so that the contactor 90 closes the electrical circuit between the terminals 193 and 194. If the contactor 90 is moved to the left, the contact point 130*b* slides along the contact bar element 194*c* until the contact point 130*b* slides into engagement with the insulating boss 204 which occupies the gap 200. In this way, the circuit between the terminals 193 and 194 is broken or turned OFF.

If the movement of the contactor 90 to the left is continued, the contact point 130*b* engages the contact bar element 194*d* so that the electrical circuit between the terminals 193 and 194 is again closed or turned ON.

As the clutch contactor 90 is moved farther to the left, the contact point 130*b* slides from the contact bar element 194*d* to the insulating boss 206 which occupies the gap 202. In this way, the electrical circuit between the terminals 193 and 194 is again broken or turned OFF.

As the leftward movement of the contactor 90 is continued, the contact point 130*b* slides from the insulating boss 206 into engagement with the contact bar element 194*e* so that the electrical circuit between the terminals 193 and 194 is again closed or turned ON. This condition prevails for the remainder of the movement of the clutch contactor 90 to its extreme left-hand position, as shown in FIG. 30.

The case 14 of the rotary vacuum-electric switch 10 is provided with first and second flexible resilient mounting members 223*a* and 223*b* having front portions in the form of respective latching hooks 224*a* and 224*b* which are adapted to be inserted into respective first and second slots 226*a* and 226*b* in a simulated mounting or supporting panel 228, shown in FIGS. 13–15, which represents a panel component of an automotive vehicle, adapted to be located behind the dashboard of the vehicle. The latching hooks 224*a* and 224*b*, which are also shown in FIGS. 3, 5, 6–12 and 17, can be pushed through the slots 226*a* and 226*b* with a strictly linear movement, so that the mounting of the switch 10 on the panel 228 can easily be accomplished by a robotic machine.

The substantially cylindrical boss 20 which projects forwardly from the front wall 18 of the case 14, as previously described, is adapted to be received in a generally cylindrical opening 230, formed in the supporting panel 228. The mounting members 223*a* and 223*b* are generally rectangular in cross section. Similarly, the slots 226*a* and 226*b* are substantially rectangular in shape. The center or axis of the boss 20 and the centers of the mounting members 223*a* and 223*b* define a triangular configuration. Moreover, the center or axis of the substantially cylindrical opening 230 and the centers of the slots 226*a* and 226*b* define a similar triangular configuration. Such triangular configurations insure that the case 14 of the switch 10 will be mounted on the panel 228 in the correct orientation. Moreover, the triangular configurations have the effect of stabilizing the case 14 against rotary displacement relative to the panel 228.

Although these triangular configurations are similar, they preferably are not exactly the same, but are slightly different in size. The size difference has the advantage of producing a tight interference fit between the mounting members 223*a* and 223*b* and the corresponding slots 226*a* and 226*b*. More specifically, the centers of the mounting members 223*a* and 223*b* define a plane which is laterally offset or spaced from the center or axis of the boss 20 by a distance or spacing 236*a*, as shown in FIG. 13. The centers of the slots 226*a* and 226*b* define a plane which is laterally offset from the center or axis of the cylindrical opening 230 by a distance or spacing 236*b*, as shown in FIG. 15. The distance or spacing 236*b* is different from the distance or spacing 236*a* and preferably is greater than the distance 236*a* by an amount sufficient to produce a tight interference fit between the mounting members 223*a* and 223*b* and the respective slots 226*a* and 226*b*.

The mounting members 223*a* and 223*b* are preferably molded in one piece with left and right hand side walls 232*a* and 232*b* of the case 14. Moreover, the mounting members 223*a* and 223*b* are provided with flexible resilient means whereby the members 223*a* and 223*b* and the associated latching hooks 224*a* and 224*b* can be swung or deflected inwardly and outwardly toward and away from each other, so that the latching hooks 224*a* and 224*b* can be pushed through the slots 226*a* and 226*b*, into latching engagement with the supporting panel 228. In this case, such flexible resilient means take the form of pairs of narrow webs 234*a* and 234*b* whereby the mounting members 223*a* and 223*b* are connected to the side walls 232*a* and 232*b* of the case 14. The thin narrow webs 234*a* and 234*b* and the adjacent portions of the side walls 232*a* and 232*b* act in the manner of torsion springs which are twisted by the inward movement of the mounting members toward each other.

To facilitate the insertion of the mounting members 223*a* and 223*b* into the slots 226*a* and 226*b*, despite the interference fit, the mounting members 223*a* and 223*b* are tapered, as shown in FIGS. 12 and 12*a*. Moreover, the flexible resilient portions 234*a* and 234*b* of the mounting members 223*a* and 223*b* enable the mounting members 223*a* and 223*b* to yield in a resilient manner, so as to facilitate the full insertion of the mounting members 223*a* and 223*b* into the corresponding slots 226*a* and 226*b* in the supporting panel 228, despite the interference fit.

As shown in FIGS. 6, 10 and 12*a*, the case 14 of the rotary vacuum-electric switch 10 is preferably formed with an anti-rotation pin 238 projecting forwardly from the front wall 18 of the case 14 and molded in one piece therewith. The pin 238 is shown as being parallel with the axis of the boss 20 and spaced a substantial distance therefrom. As shown, the pin 238 is located centrally near the lower edge of the front wall 18.

As shown in FIGS. 13–15, the anti-rotation pin 238 is adapted to be received in a locating hole 240 formed in the supporting panel 228 for the switch 10. To facilitate the insertion of the anti-rotation pin 238 into the locating hole 240, the pin 238 is tapered forwardly. The pin 238 fits snugly in the locating hole 240 and is effective to prevent rotation of the case 14 relative to the supporting panel 228, while also insuring that the case 14 is mounted on the supporting panel 228 in the correct angular orientation.

As shown in FIG. 6, the front wall 18 of the case 14 for the rotary vacuum-electric switch 10 is formed with first and second U-shaped clearance slots 242*a* and 242*b* extending around the first and second mounting members 223*a* and 223*b* to provide for lateral flexing movement of the mounting members in a direction toward and away from each other. Moreover, each of the side walls 232*a* and 232*b* is formed with a pair of clearance slots 244 connecting with the slots 242*a* and 242*b* and disposed on opposite sides of the mounting members 223*a* and 223*b*, as shown in FIG. 12*a*.

The left and right hand latching hooks 224a and 224b are formed with respective lateral ramps 246a and 246b, facing laterally outwardly, as shown in FIGS. 8 and 12, for deflecting the latching hooks 224a and 224b and the mounting members 223a and 223b laterally toward each other, when the latching hooks 224a and 224b are pushed through the slots 226a and 226b in the supporting panel 228.

The rear portions of the lateral ramps 246a and 246b connect with rearwardly facing hook shoulders 248a and 248b, adapted to engage the front surface 250 of the supporting panel 228 when the latching hooks 224a and 224b are pushed fully through the slots 226a and 226b in the panel 228. The lateral ramps 246a and 246b taper forwardly away from the hook shoulders 248a and 248b, as shown in FIGS. 8 and 12.

FIG. 17 is a greatly enlarged longitudinal section, taken through the right hand latching hook 224b. It will be understood that the left hand latching hook 224a is the same in construction, except that it is reversed from left to right. As shown in FIG. 17, each of the hook shoulders 248a and 248b comprises a rearwardly facing hook ramp 252 sloping forwardly and laterally and terminating in a rearwardly sloping terminal portion 254 which also includes a rounded corner 256 merging into a laterally facing surface 258 which connects with the lateral ramp 246b.

As shown in FIGS. 15 and 16, the slots 226a and 226b in the supporting panel 228 have respective lateral wall portions 260a and 260b for engagement by the corresponding lateral ramps 246a and 246b on the latching hooks 224a and 224b to produce lateral flexing movement of the latching hooks 224a and 224b and the mounting members 223a and 223b when the latching hooks are pushed forwardly through the slots 226a and 226b. The panel 228 has corner portions 262a and 262b between the front wall 250 and the lateral wall portions 260a and 260b of the corresponding slots 226a and 226b. When the latching hooks 224a and 224b are pushed through the slots 226a and 226b, the latching hooks spring outwardly until the respective hook ramps 252 engage the corner portions 262a and 262b. The provision of the hook ramps 252 achieves the very important advantage of compensating for variations in the thickness of the supporting panel 228, so as to avoid any looseness or play between the supporting panel and the latching hooks 224a and 224b, despite variations in the thickness of the panel 228.

The rearwardly sloping terminal portions 254 of the hook shoulders 248a and 248b are engageable with the corner portions 262a and 262b and also with the front wall 250 of the supporting panel 228 for retaining the latching hooks 224a and 224b in the slots 226a and 226b despite the application of substantial rearward force to the housing 12 of the switch 10. In actual service of the switch 10, a very substantial pull may be exerted upon the housing 12 when it is necessary to remove the electrical connector from the terminals 191–194, or when it is necessary to remove the vacuum connector from the nipples 56a–56f. When a strong rearward pull is exerted upon the housing 12 of the switch 10, the rounded corner portion 256 may also engage the front surface 250 of the panel 228.

As shown in FIGS. 1, 6 and 13, the rotary vacuum-electric switch 10 is provided with a forwardly projecting key element in the form of a key pin 264, adapted to be received in a key opening or hole 266 in the supporting panel 228. The key pin 264 and the key opening 266 are components of a keying system which is adapted to ensure that the correct switch or other control device is mounted at any particular position on the supporting panel 228. The illustrated rotary vacuum-electric switch 10 may be one member of a family of such switches and other control devices. Other members of the family of switches may be adapted to perform somewhat different electrical and vacuum switching operations, depending upon the requirements of various switch applications in heating, air conditioning and ventilating systems for various automotive vehicles. In accordance with the keying system, each member of the family of switches has a key pin which is uniquely located and is adapted to be received in a key opening having a corresponding unique location. In FIG. 2, ten different unique locations are numbered 1 through 10. The key pin 264 is in location No. 3. Each of the other ten locations is marked with a circle upon which a letter "x" is superimposed.

The keying system can be extended to control devices other than switches. For example, a temperature control regulator device, such as a potentiometer, is often employed in connection with a vacuum-electric switch. In FIG. 13, the supporting panel 228 is shown with a second set of elements for receiving another control device, such as a rotary potentiometer, not shown. The additional elements comprise left and right hand rectangular slots 326a and 326b, corresponding with the slots 226a and 226b; a substantially cylindrical opening 330, corresponding with the opening 230; and a hole or opening 340, corresponding with the opening 240. In addition, the supporting panel 228 is formed with a second key opening 366 which has a unique position, different from the position of the key opening 266. For example, the key opening 366 is shown in unique location No. 4, as identified in FIG. 2. Any of the other unique key locations could be employed.

If a rotary potentiometer is employed in conjunction with the rotary vacuum-electric switch 10, the keying system ensures that the rotary vacuum-electric switch 10 is installed in the position having the unique location of the key pin 264 and the opening 266. At the same time, the keying system ensures that the rotary potentiometer will be installed in the position having the unique location of the key opening 366.

FIGS. 51 and 52 illustrate an assembly fixture 370 which may be employed very advantageously to expedite the assembly of the rotary vacuum-electric switch 10. As shown, the assembly fixture 370 comprises a substantially rectangular block 372 having a flat front surface 374 adapted to receive and engage the front wall 18 of the case 14 for the switch 10. A substantially cylindrical blind opening 376 is formed in the block 372 for snugly receiving the forwardly projecting boss 20 on the case 14. The shaft 24 of the switch 10 is adapted to be received in an opening 378, formed in the block 372, coaxial with the cylindrical opening 376. The opening 378 is cylindrical, except that the opening is formed with a flat longitudinal surface 380 for engaging the longitudinal flat surface 26 on the shaft 24, so that the shaft will be positioned in a particular angular orientation or position, for the assembly of the switch 10.

The front surface 374 of the fixture block 372 is also formed with a pair of oversize blind openings 382a and 382b, adapted to receive the latching hooks 224a and 224b, with ample clearance, so that the hooks do not actually engage the block 372. The front surface 374 of the fixture block 372 is also formed with a blind cylindrical opening 384 for receiving the anti-rotation pin 238. Moreover, the front surface 374 of the fixture block 372 is formed with a uniquely positioned cylindrical key opening 386 for receiving the key pin 264 so that only the correct case 14 will fit on the fixture block 372.

Another prominent feature of the assembly fixture 370 is a locating or alignment pin 388 which projects forwardly from the front surface 374 of the fixture block 372 and is fixedly received in a cylindrical opening 390, formed in the block 372. The alignment pin 388 extends perpendicular to the front surface 374 and is located between the boss-receiving opening 376 and the pin-receiving opening 384. The pin 388 is spaced only a short distance from the pin-receiving opening 384.

In the method of assembling the rotary vacuum-electric switch 10, some of the components of the switch are first assembled to produce a plurality of subassemblies. The case 14 and the terminal cluster 176 are assembled as previously described to produce the case-terminal subassembly shown in FIGS. 30 and 31.

An electrical carriage-contactor subassembly is produced by assembling the electrical carriage 86, the fan contactor 88, the clutch contactor 90 and the contactor springs 120 and 126, as previously described and as illustrated in FIGS. 34 and 35.

Figure 32:
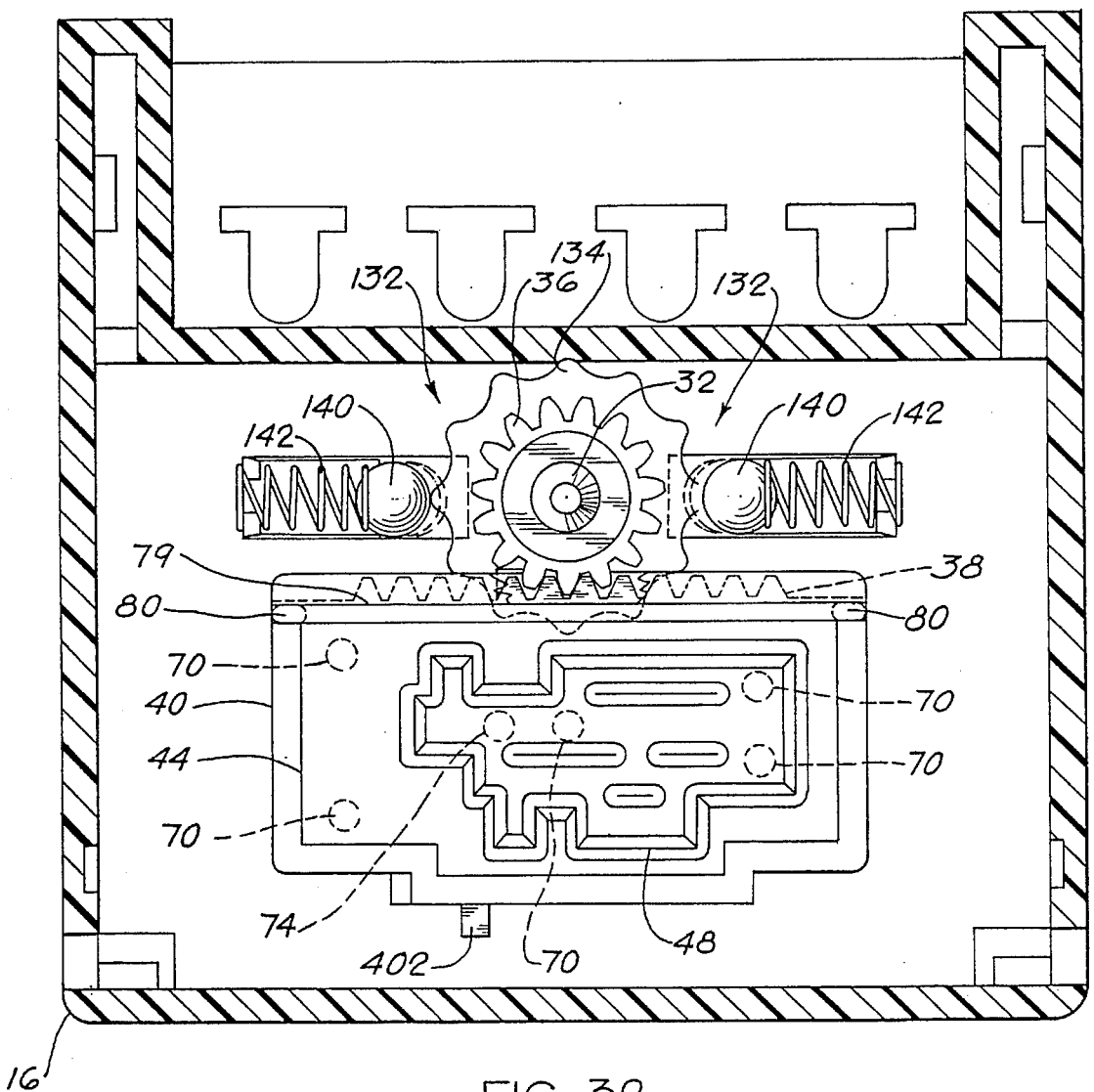
FIG. 32 is a somewhat diagrammatic rear elevation, partly in section, showing a partial assembly of the cover, the detent wheel, the detent balls and springs, the pinion gear on the driver, the valve carriage, and the valve for the switch.
Figure 32A:
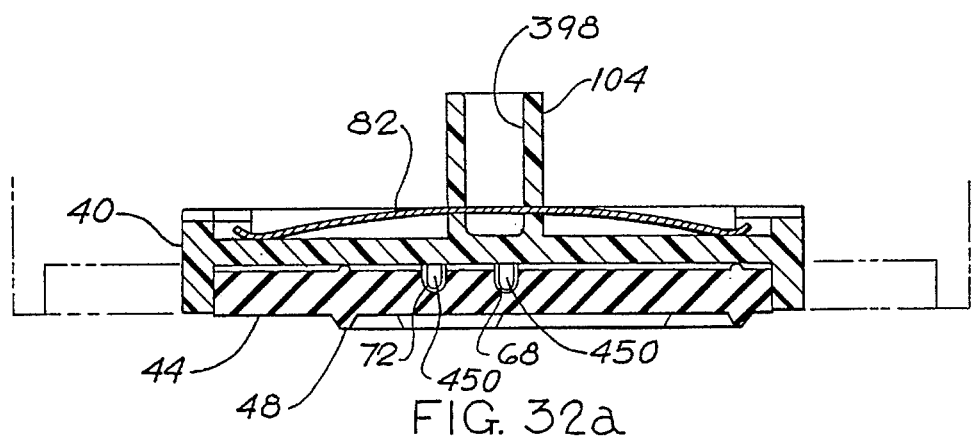
FIG. 32a is a somewhat diagrammatic horizontal section showing the valve carriage, the valve and the valve spring.
Figure 32B:
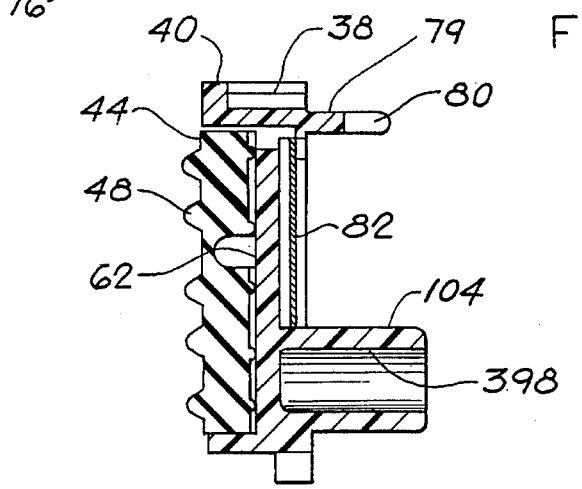
FIG. 32b is a somewhat diagrammatic vertical section showing the valve carriage, the valve and the valve spring.

The valve carriage 40, the rubber valve 44 and the leaf spring 82 are assembled as previously described to produce the valve carriage subassembly, as shown in FIGS. 32a and 32b.

The control shaft 24 and the driver 30 are assembled, as previously described, to produce the shaft-driver subassembly as illustrated in FIG. 35.

As shown in FIGS. 6 and 30, the front wall 18 of the case 14 for the rotary vacuum-electric switch 10 is formed with a cylindrical alignment hole or opening 392 for receiving the alignment pin 388 on the assembly fixture 370. In the assembly of the switch 10, the case-terminal subassembly of FIG. 30 is placed on the assembly fixture 370 in such a manner that the alignment pin 388 extends through the alignment hole 392 in the front wall 18 of the case 14. The boss 20 on the front wall 18 is inserted into the cylindrical opening 376 in the fixture block 372. The latching hooks 224a and 224b are inserted into the oversize openings 382a and 382b. The anti-rotation pin 238 and the key pin 264 are inserted into the respective openings 384 and 386 in the fixture block 372.

As shown in FIGS. 34 and 80, the clutch contactor 90 is formed with a circular opening or hole 394 for receiving the alignment pin 388. As shown to best advantage in FIGS. 67, 72 and 73, the electrical carriage 86 is provided with a circular opening or hole 396 for receiving the alignment pin 388. Moreover, the inner diameter of the compression coil spring 126 for the clutch contactor 90 is large enough so that the alignment pin 388 can be inserted freely through the interior opening in the spring 126.

Thus, the assembly of the switch 10 is continued by mounting the electrical carriage-contactor subassembly on the alignment pin 388 so that the pin passes successively through the hole 394 in the clutch contactor 90, the interior opening in the coil spring 126 and the circular hole 396 in the electrical carriage 86.

To continue the assembly of the switch 10, the shaft 24 is inserted through the cylindrical opening 22 in the case 14 and then into the shaft-receiving opening 378 in the fixture block 372. The flat surface 26 on the shaft 24 mates with the flat surface 380 in the opening 378, so that the shaft and the driver are positioned in the correct angular orientation for the assembly of the switch 10.

Next, the idler gear 102 is assembled on the alignment pin 388 so that the pin extends through an axial opening 397 of reduced size and coaxial with the axial opening 108 in the idler gear 102 (FIG. 35). The assembly is continued by adding the spacer 76 so that the alignment pin 388 extends through the horizontal guide slot 106 in the spacer 76.

Next, the valve carriage subassembly of FIGS. 32a and 32b is added to the assembly in such a manner that the bearing 104 extends through the horizontal slot 106 in the spacer 76 and also into the axial opening 108 in the idler gear 102. At the same time, the outer end portion of the alignment pin 388 is inserted into a blind axial opening 398 which is formed in the bearing 104. The blind axial opening 398 is shown in FIGS. 32a and 32b.

In carrying out the assembly procedure, as just described, the idler gear 102 is positioned so that its lower portion meshes with the linear gear rack 110 on the case 14, while its upper portion meshes with the linear gear rack 114 on the electrical carriage 86. The relative positions of the spacer 76 and the electrical carriage 86 are adjusted so that the flange 96 on the electrical carriage 86 is slidably received in the guide groove 92 in the spacer 76, while the guide flange 94 on the spacer 76 is received in the groove or channel 98 in the electrical carriage 86. The position of the valve carriage 40 is adjusted so that the linear gear rack 38 on the upper edge thereof meshes with the pinion gear 36 on the driver 30. At the same time, the relative positions of the valve carriage 40 and the spacer 76 are adjusted so that the forwardly projecting ridge 79 and tabs 80 on the valve carriage 40 are slidably received in the rearwardly facing groove 78 in the spacer 76.

The alignment pin 388 insures that the electrical carriage 86, the valve carriage 40, and the idler gear 102 are centrally positioned with a high degree of accuracy, so that the proper meshing engagement is assured between the pinion gear 36 and the linear gear rack 38 on the valve carriage 40, as well as between the idler gear 102 and the linear gear racks 110 and 114 on the case 14 and the electrical carriage 86, respectively.

In FIGS. 32–34 and 60, the various components of the switch are shown in the centrally aligned positions which they occupy under the constraints imposed by the alignment pin 388. Moreover, the shaft 24 and the driver 30 are shown in the positions which they occupy when the flat surface 26 on the shaft 24 is mated with the flat surface 380 in the shaft-receiving opening 378 formed in the fixture block 372. In this position of the driver 30, the detent wheel 134 is midway between two detented positions, so that the detent balls 140 engage two of the rounded peaks or teeth 138 of the detent wheel 134, rather than being received in the detent notches 136.

The switch 10 is provided with an additional keying system to insure that the correct valve carriage 40 is assembled with the other components of the switch. As previously indicated, the switch 10 may be a member of a family of vacuum-electric switches having a variety of vacuum switching functions produced by different valves.

The additional keying system comprises key and keyway means on the valve carriage 40 and the housing 12, such means comprising a keying tab 402 projecting downwardly in a unique location on the valve carriage 40, as shown in FIGS. 32, 38, 40, 41 and 42. The case 14 is provided with a corresponding keyway or notch 404 formed in an upwardly projecting flange or ledge 406 on a lower wall portion 408 of the case 14. When the valve carriage 40 is being assembled with the other components of the switch, as just described, the uniquely positioned tab 402 must be moved through the uniquely positioned notch 404 in order to mate the blind axial opening 398, formed in the bearing 104, with the end of the alignment pin 388.

For each member of the family of rotary vacuum-electric switches, the valve carriage 40 has a different unique location for the keying tab 402, so that any incorrect valve carriage cannot be assembled into the illustrated rotary vacuum-electric switch 10. At least as many as ten different unique positions for the keying tab 402 can be provided along the lower edge of the valve carriage 40. Moreover, at least as many as ten different locations can be provided for the keying notch 404 in the upturned flange 406.

Preferably, the case 14, the valve carriage 40 and the rubber valve 44 are also color coded, in that each member of the family of switches has a unique color. For example, the case 14, the valve carriage 40 and the rubber valve 44 may be green in color. The corresponding components for other members of the family may be identified by such colors as white, red, and black, for example.

As previously indicated, the spacer 76 is assembled and retained between the case 14 and the cover 16 of the rotary vacuum-electric switch 10. As shown in FIGS. 61–65, the spacer 76 is formed with a pair of forwardly projecting members or lugs 410 adapted to be received in corresponding notches 412 formed in the left and right hand side walls 232a and 232b of the case 14, as shown in FIGS. 10 and 12a. The rear edges of the side wall portions 232a and 232b are engageable with a pair of forwardly facing wall portions 414 on the spacer 76.

The spacer 76 has a pair of downwardly projecting tabs 416, with an elongated cutout 418 therebetween, adapted to receive the lower wall portion 408 of the case 14. As shown in FIG. 11, the lower wall portion 408 extends rearwardly from the lower wall portion 112, which has a pair of rear edge portions 420 adapted to be engaged by the tabs 416 on the spacer 76. As shown in FIGS. 61, 63 and 64, the spacer 76 is formed with a pair of forwardly projecting hollow bosses 422 adapted to fit between the side wall portions 232a and 232b of the case 14, as shown in FIGS. 10 and 12a.

The tabs 416 on the spacer 76 are adapted to engage a pair of rearwardly facing hollow bosses 424 on the cover 16, as shown in FIGS. 18 and 25. Along its upper edge, the spacer 76 is provided with a pair of upwardly projecting tabs 426 which are adapted to engage a pair of rearwardly facing flanges 428 inside the cover 16, as shown in FIG. 24.

After the internal components of the switch 10 have been assembled into the case 14, as described above, the assembly of the switch 10 is completed by mounting the cover 16 around the rear portion of the case 14. The cover 16 fits telescopically around the rear portion of the case 14. When the cover 16 is pushed into full engagement with the case 14, the cover 16 and the case 14 are latched together by first and second pairs of latching teeth 430 and 432. As shown in FIGS. 18 and 25, the latching teeth 430 of the first pair project upwardly from a lower wall portion 434 of the cover 16 and are adapted to snap into recesses 436 formed in the case 14, as shown in FIG. 8. The latching teeth 432 of the second pair project outwardly from opposite side wall portions 438 of the cover 16, as shown in FIG. 23, and are adapted to snap into a pair of recesses 440 formed in a pair of side wall portions 442 on the case 14, as shown in FIG. 10.

When the case 14 and the cover 16 have been assembled, the assembled switch 10 is removed from the assembly fixture 370. As previously described, the detent balls 140 and the associated coil springs 142 can be assembled into the tunnel structures 144 on the rear wall portion 146 of the cover 16, either before or after the cover 16 is assembled with the case 14.

FIGS. 86 and 87 are charts showing the vacuum switching and electrical switching functions of the rotary vacuum-electric switch 10 for all of the various detented positions of the control shaft 24. These charts should be considered in connection with FIG. 1, which identifies and locates the detented positions of the shaft 24. In FIGS. 1, 86 and 87, the eight detented positions of the shaft 24 are identified by the same abbreviated names, which would also appear on the dashboard of the automotive vehicle on which the switch 10 is used. These abbreviated names are in widespread use and are well understood by those skilled in the art. The detented positions comprise a maximum air conditioning position; a normal air conditioning position; a ventilation position; an OFF position; a VENT FLOOR position in which heated and/or cooled air is supplied to both the panel vents and the floor outlets; a FLOOR position in which heated air is supplied to the floor outlets only; a FLOOR DEFROST position in which heated and/or cooled air is supplied to both the floor outlets and the defrost outlets; and a DEFROST position in which heated and/or cooled air is supplied to the defrost outlets only. The combined use of air conditioning and heat has the effect of dehumidifying the air which is supplied to the outlets.

As shown in FIG. 87, the electrical terminals 192 and 194 of the switch 10 are connected to the battery of the vehicle. The terminal 191 is connected to the blower or fan which is used for heating, ventilating and air conditioning. The terminal 193 is connected to the air conditioning clutch which is energized to drive the air conditioning compressor. It will be seen from FIG. 87 that the blower terminal 191 is connected to the battery terminal 192 for all of the detented positions of the switch except the OFF position, in which the blower is not energized. The air conditioning clutch is energized for all of the positions except the VENT position, the OFF position and the FLOOR position. The VENT position is used for ventilation only. The FLOOR position is used for heating only. In the OFF position, the entire system is shut down. In all of the other positions, air conditioning is available.

FIG. 86 shows that the vacuum port 54a is connected to a vacuum responsive device which switches between recirculated air and fresh air, drawn from the outside of the vehicle. The port 54b is connected to a vacuum responsive device which switches the full outputted air to the floor outlets. The port 54c is connected to a vacuum responsive device which splits the outputted air between the defrost outlets and the floor outlets. The valve port 54d is connected to a vacuum responsive device which switches the full outputted air to the panel vents. The port 54e is connected to the vacuum source, such as the intake manifold of the vehicle. The port 54f is connected to a vacuum responsive device which switches the outputted air between the panel vents and the floor outlets. The chart of FIG. 86 identifies the particular ports which are connected to the vacuum source or to the atmosphere for each of the detented positions of the switch 10.

The charts or tables of FIGS. 86 and 87 represent only one of many variations of a large family of switches which can be constructed in accordance with the present invention.

Figure 43:
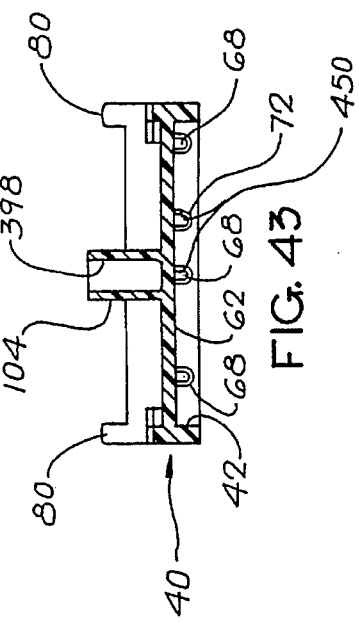
FIG. 43 is horizontal section taken through the valve carriage, generally along the broken line 43—43 in FIG. 38.
Figure 41:
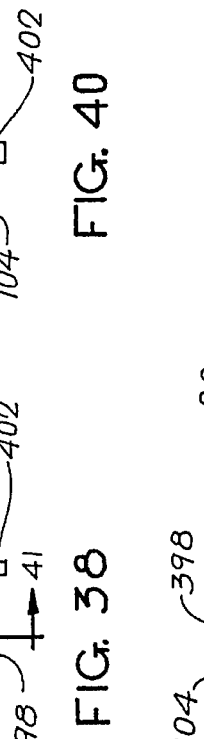
FIG. 41 is a central vertical section, taken through the valve carriage, generally along the line 41—41 in FIG. 38.
Figure 45:
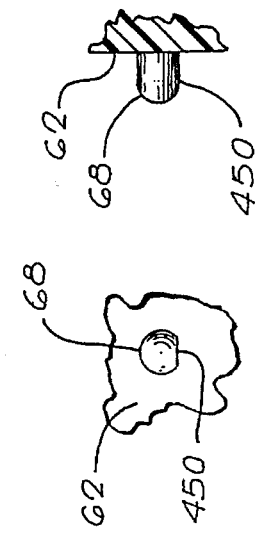
FIG. 45 is a fragmentary enlarged elevation showing one of the locating pins.

As shown in FIGS. 42 and 43, the pins 68 and 72 on the valve carriage 40 are substantially cylindrical in shape, except that the pins are formed with small flat surfaces 450 thereon so that air can escape from the blind openings 70 and 74 in the rubber valve 44, when the valve 44 is assembled with the valve carriage 40. The air escapes from the openings 70 and 74 through the small passages which are formed between the flat surfaces 450 and the cylindrical walls of the openings 70 and 74. If the flat surfaces 450 were not provided, the air in the blind openings 70 and 74 would be compressed by the rapid mounting of the rubber valve 44 on the valve carriage 40, so that the rubber valve 44 would tend to be displaced from the valve carriage 40 by the compressed air. Other air escape passage means could be provided between the pins and the corresponding openings.

Various other modifications, alternative constructions and equivalents may be employed without departing from the true spirit and scope of the present invention as described in the preceding specification and defined in the following claims.

I claim:

1. A rotary vacuum valve, comprising a housing, an operating shaft rotatable in said housing to a plurality of angularly spaced positions, a pinion gear rotatable with said shaft in said housing, a valve carriage movable in said housing and having a gear rack meshing with said pinion gear, guide means in said housing and on said valve carriage for guiding said valve carriage for translatory movement along a predetermined path, said guide means including slidably engagable components which are in sliding engagement when said valve carriage is assembled with said housing, vacuum valve means on said valve carriage and said housing for performing vacuum valving functions when said valve carriage is translated in said housing, and mating key and keyway elements located on said housing and said valve carriage in a selected one of a plurality of predetermined keying positions to assure correct mating of said valve carriage and said housing during the initial assembly of said valve carriage with said housing, said mating key and keyway elements being momentarily engaged and mated during said initial assembly but being completely out of engagement when said valve carriage is fully assembled with said housing, one of said elements being disposed on said valve carriage while the other of said elements is disposed on said housing, the element disposed on said housing being positioned on said housing to obstruct the assembly of an incorrect valve carriage with the housing when the elements are not properly mated with one another.

2. A rotary vacuum valve according to claim 1, in which said key and keyway elements comprise a tab projecting from said valve carriage and a mating slot in a flange portion of said housing for receiving said tab, said flange portion being positioned on said housing to obstruct the assembly of the incorrect valve carriage with the housing when the tab and the slot are not properly mated with one another, said tab being moveable through said slot during said initial assembly but being completely out of engagement when said valve carriage is fully assembled with said housing.

* * * * *